(12) United States Patent
Kashiwagi et al.

(10) Patent No.: US 7,032,043 B1
(45) Date of Patent: Apr. 18, 2006

(54) KEYBOARD STORAGE DEVICE FOR A COMPUTER SYSTEM

(75) Inventors: Toshiyuki Kashiwagi, Kawasaki (JP); Naohiko Ichimura, Kawasaki (JP); Hirotaka Sugaya, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/512,884

(22) Filed: Feb. 25, 2000

(30) Foreign Application Priority Data

Jul. 5, 1999 (JP) .................................. 11-191023

(51) Int. Cl.
*G06F 13/00* (2006.01)

(52) U.S. Cl. .................... 710/100; 361/680; 361/600

(58) Field of Classification Search ................ 710/100, 710/300, 1, 106, 8; 361/680–683, 600; 345/156
See application file for complete search history.

(56) References Cited

U.S. PATENT DOCUMENTS

| | | | | |
|---|---|---|---|---|
| 5,168,427 A | * | 12/1992 | Clancy et al. ............ 361/680 |
| 5,267,127 A | * | 11/1993 | Pollitt .................... 361/680 |
| 5,483,253 A | * | 1/1996 | Suganuma et al. ........ 345/87 |
| 6,006,243 A | * | 12/1999 | Karidis ................... 708/100 |
| 6,108,716 A | * | 8/2000 | Kimura et al. |
| 6,185,092 B1 | * | 2/2001 | Landrum et al. ......... 361/683 |
| 6,353,532 B1 | * | 3/2002 | Landrum et al. ......... 361/683 |
| 2003/0107871 A1 | * | 6/2003 | Vathulya ................. 361/681 |

FOREIGN PATENT DOCUMENTS

| | | |
|---|---|---|
| JP | 64-39518 | 3/1989 |
| JP | 4-123218 | 4/1992 |
| JP | 5-55221 | 7/1993 |
| JP | 06-028084 | 2/1994 |
| JP | 9-6505 | 1/1997 |
| JP | 09-244763 | 9/1997 |

* cited by examiner

*Primary Examiner*—Rehana Perveen
*Assistant Examiner*—Kim T. Huynh
(74) *Attorney, Agent, or Firm*—Armstrong, Kratz, Quintos, Hanson & Brooks, LLP

(57) ABSTRACT

An electronic apparatus has a main unit, a display unit rotatably attached to the main unit, an input device detachably connected to the main unit and a retaining mechanism retaining the input device between the display unit and the main unit.

9 Claims, 21 Drawing Sheets

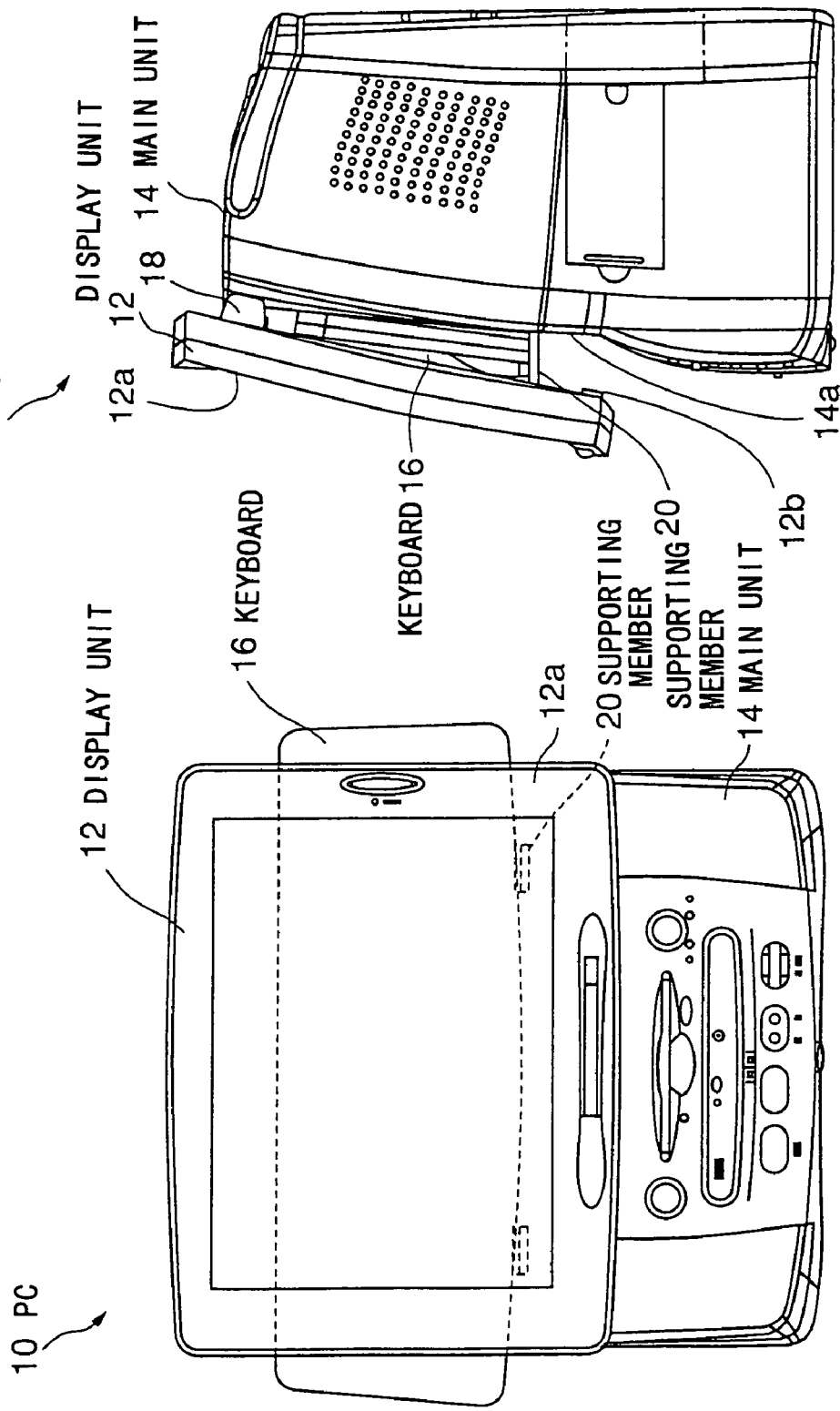

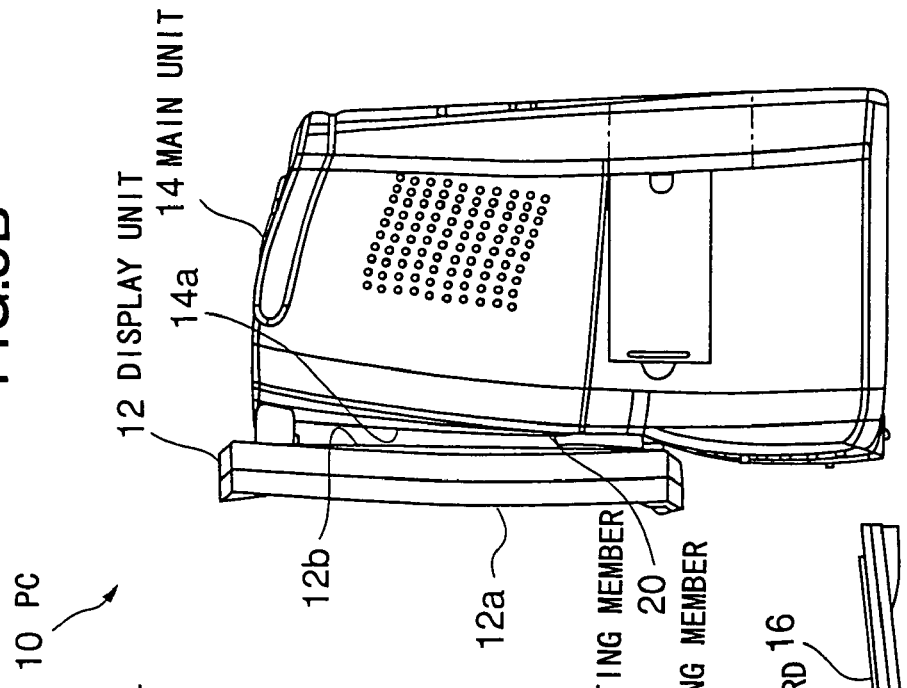
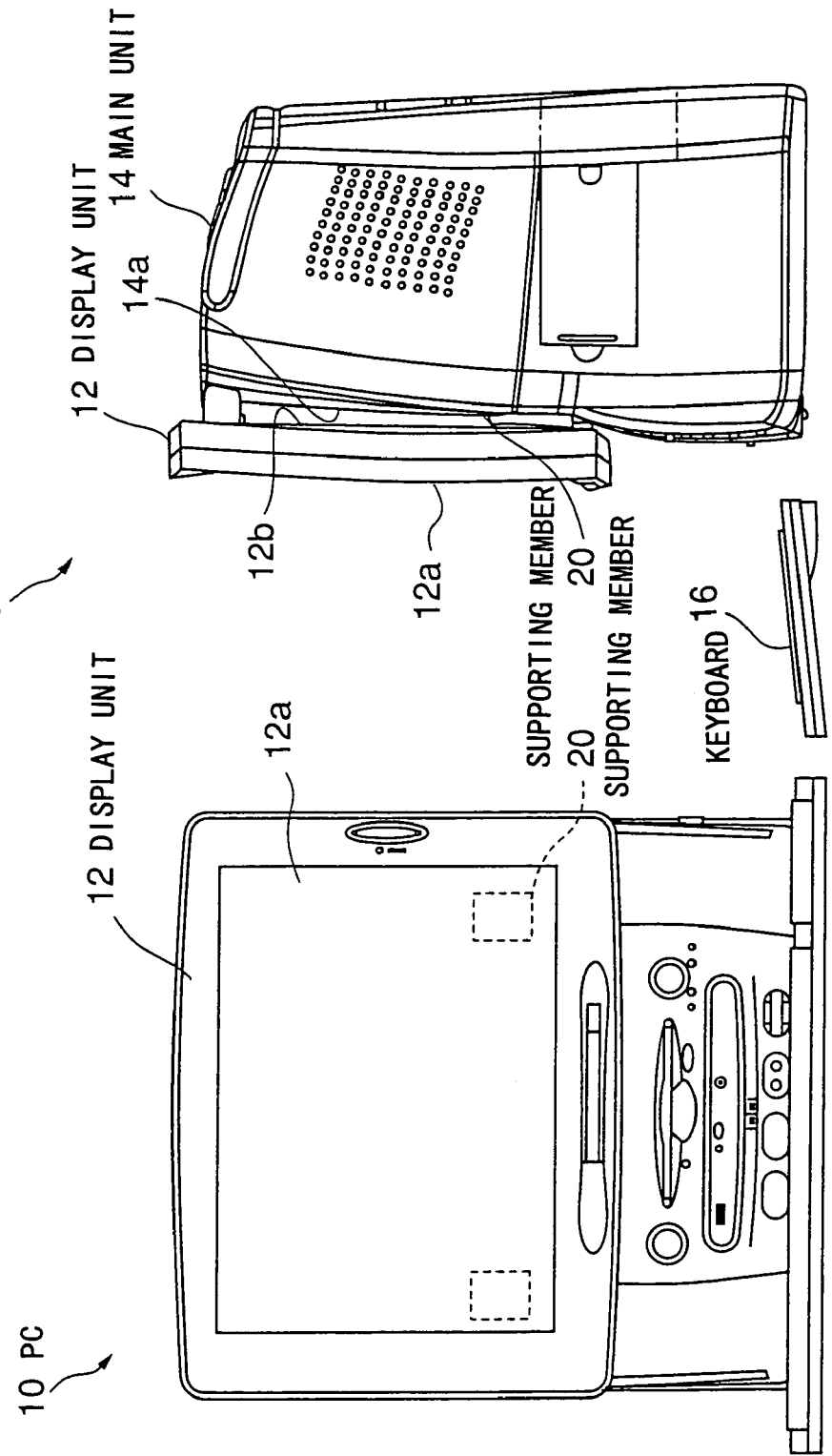

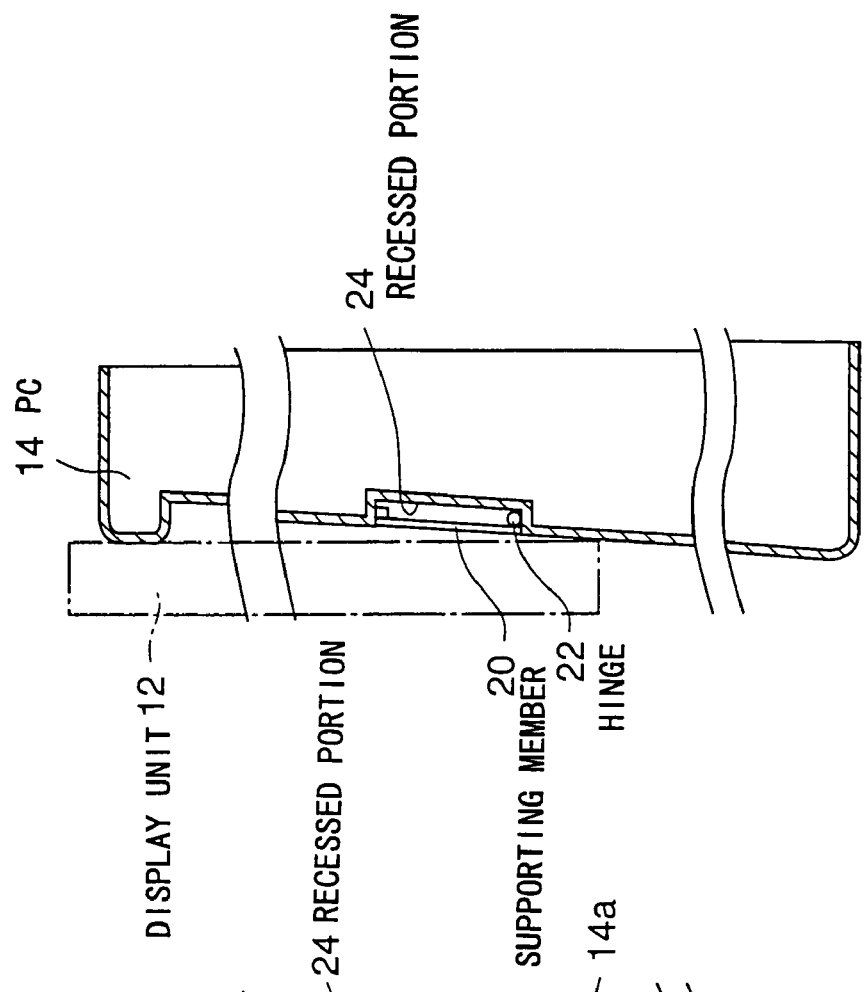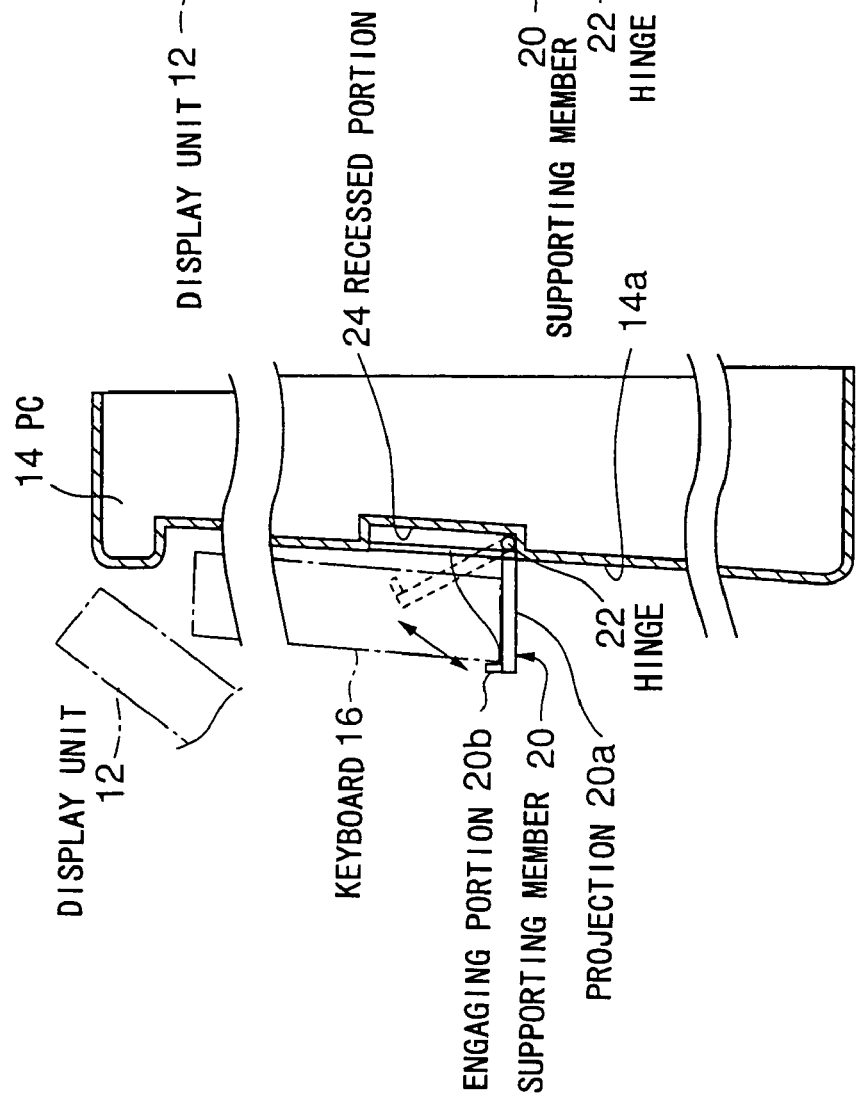

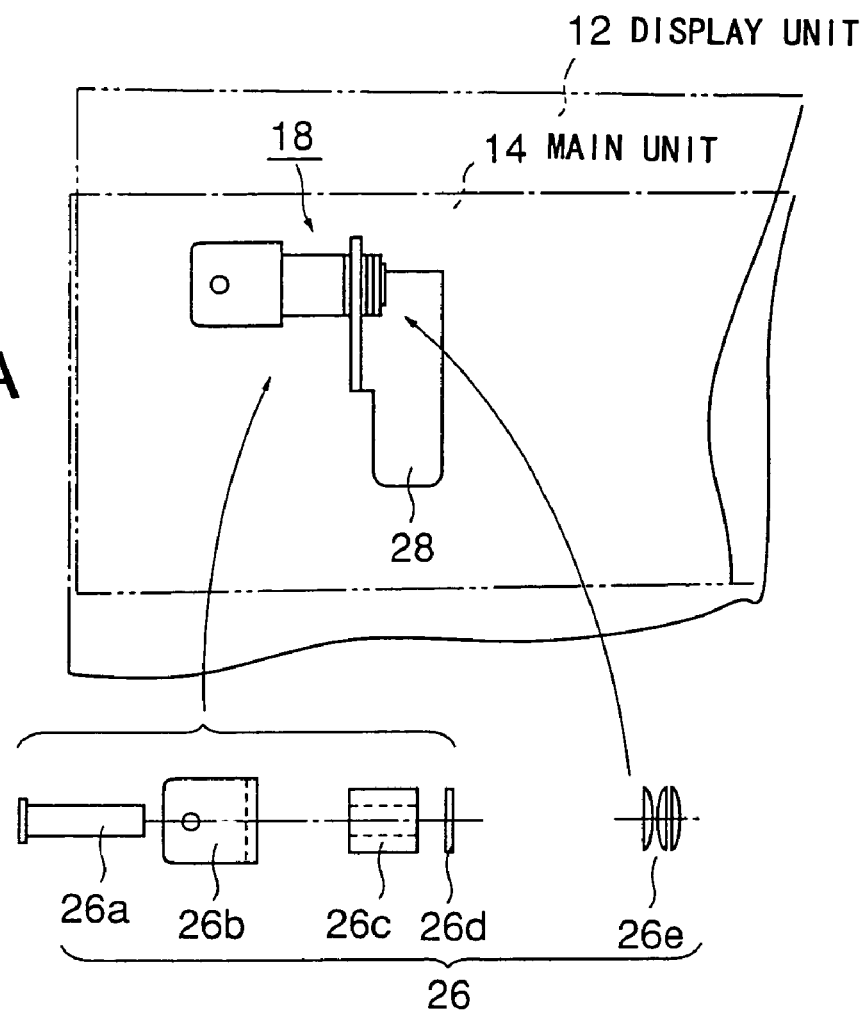
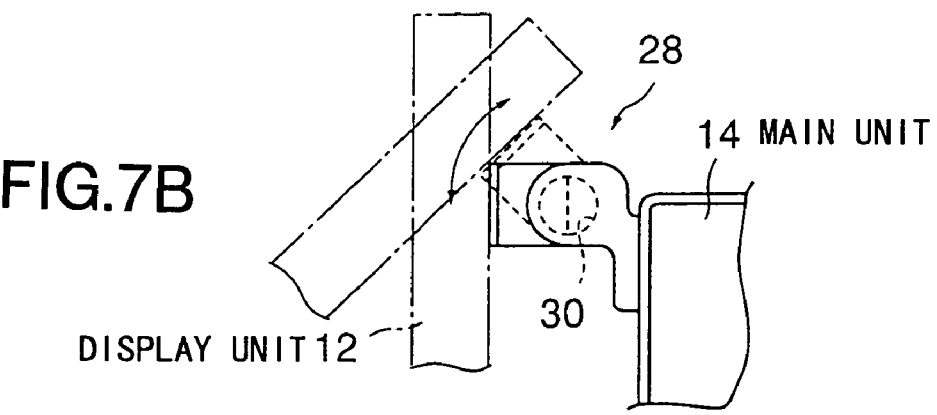

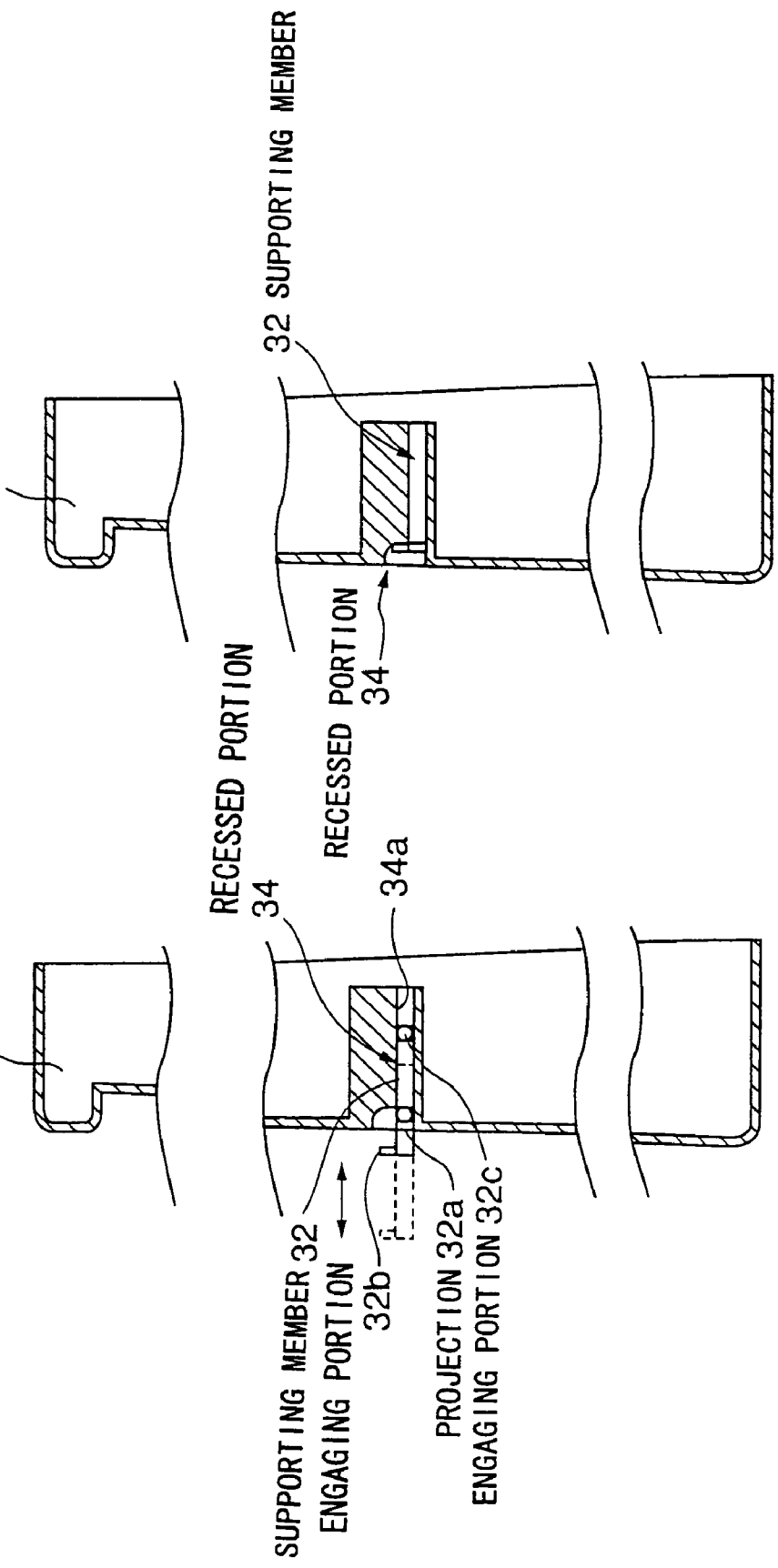

KEYBOARD STORAGE DEVICE FOR A COMPUTER SYSTEM

BACKGROUND OF THE INVENTION

1. Field of the Invention

The present invention relates generally to an electronic apparatus and input device, and more particularly, to an electronic apparatus and input device in which the input device is detachably connected to the main unit of the electronic device.

2. Description of the Related Art

In recent years the personal computer has come into widespread use, with space-efficient personal computers designed with office environment and home use needs in mind being sought amid increasing demand for enhanced performance and enhanced expansion capabilities.

In response to these needs there has appeared a more compact desktop-type personal computer, in which the main unit and the liquid crystal display panel are integrated so as to form a single unit.

For the above-described personal computer, it is preferable that the keyboard used be a compact one so as to be easily moved when not in use. If the keyboard is left on top of the desk when not in use, then the usable work area of the desk is reduced proportionally, and the space-saving advantage of a compact main unit is thereby lost.

As a result, when the personal computer is not in use the keyboard is stored out of the way by mounting it on the main unit.

FIG. 1 shows an example of a conventional personal computer (Japanese Laid-Open Patent App. No. 9-6505 to be described later), having a structure such that the keyboard 2 can be slung on the front of the main unit 1 and shown with the keyboard 2 attached to the main unit 1.

In the case of the above-described personal computer, legs 3 rotatable to the front and rear as indicated by the arrow in FIG. 1 are provided on a back surface 2a of the keyboard at both the left and right sides near the edge. Additionally, a groove portion 4 is formed on the legs 3. At the same time, supporting members 6 extend from both edges of a front surface 5a of a display unit 5 of the personal computer main unit 1.

When the keyboard 2 is not in use, after an operating power source not shown in the drawing is shut down the legs 3 are extended, the groove portion 4 of the legs 3 engages the supporting member 6 of the display unit 5 and the keyboard is slung. It should be noted that the legs 3 are stored in slot portions 7 formed on the back surface 2a of the keyboard 2 when the keyboard 2 is not in use.

However, according to the above-described keyboard storage structure, a width between the inside edge surfaces 3a of the legs 3 of the keyboard 2 must be identical to a width between the supporting members 6 of the display unit 5. As a result, an inconvenience arises in that the keyboard 2 is naturally wider than this width 3a between the legs 3 thereof.

According to the keyboard storage structure of Japanese Laid-Open Patent App. No. 9-6505 which remedied this disadvantage, legs 3 that open laterally outward are provided on both left and right side edges of the keyboard 2 as shown in FIG. 2, such that in an open state groove or engaging portions 4 formed on the legs 3 engage supporting members (engaging portions) 6 formed on both side edges of the display unit 5 of the main unit 1.

It should be noted that identical parts of the prior art examples shown in FIGS. 1, 2 and elsewhere hereinafter, as the case may be, are given identical reference numbers.

Additionally, according to the keyboard storage structure of Japanese Laid-Open Patent App. No. 4-123218, a groove portion, that is, an engaging hole 4A, is provided on a front edge portion and a hook 7A is provided on a rear edge portion as shown in FIG. 3. At the same time, a support stand 8 that is pulled out for storage is provided on a lower part of a front surface of the personal computer main unit 1, with a groove portion 4B formed on the support stand 8. When storing the keyboard 2 the support stand 8 is pulled out, the hook 7A of the keyboard 2 engages the groove portion 4B and a detachable keyboard attachment accessory 9 that fits onto an upper part of the front surface of the display unit 5 is attached so that a hook 7B of the above-described keyboard attachment accessory 9 engages the groove portion 4A.

However, the above-described conventional keyboard storage structure suffers from the disadvantage that the keyboard easily comes loose from the personal computer main unit whenever any type of shock is applied.

SUMMARY OF THE INVENTION

Accordingly, it is a general object of the present invention to provide an improved and useful electronic apparatus and input device in which the disadvantage described above is eliminated, and more specifically, to provide an improved and useful electronic apparatus and input device in which the input device is securely stored in the main unit of the electronic apparatus when the input device is not in use, so that desktop space may be utilized more efficiently.

Another and further object of the present invention is to provide an improved and useful electronic apparatus that controls a desired operation of the electronic apparatus by the storage of the input device in or the removal of the input device from the electronic apparatus.

Still another and further object of the present invention is to provide an electronic apparatus having a superior aesthetic appearance in a state in which the input device is stored in the electronic apparatus.

The above-described objects of the present invention are achieved by an electronic apparatus detachably connected to an input device, comprising:

a main unit;

a display unit rotatably attached to the main unit; and a retaining mechanism retaining the input device between the display unit and the main unit.

Additionally, the above-described objects of the present invention are also achieved by the electronic apparatus as described above, wherein the retaining mechanism comprises at least one supporting member.

According to the invention described above, the input device is restrained by the back surface of the display unit and stored between the display unit and the main unit in order to utilize the desktop space more efficiently when the input device is not in use. Accordingly, the input device does not come loose from the main unit even when some shock force is applied thereto and the input device can be securely stored between the main unit and the display unit. Additionally, the electronic apparatus can be given a superior functional appearance in a state in which the input device is stored because the supporting member is provided on a lower back surface of the display unit and does not intrude upon the field of vision.

Additionally, the above-described objects of the present invention are also achieved by the electronic apparatus as described above, wherein the supporting member is mounted so as to be storable in the main unit when the input device is not being stored.

According to the invention described above, the supporting member does not become an obstruction and thereby damage either the main unit or the display device. Moreover, the aesthetic appearance of the electronic apparatus as a whole is further improved because the main unit supporting member does not intrude upon the user's vision.

It should be noted that that either a hinge mechanism or a slide mechanism can be used with the above-described supporting member.

Additionally, the above-described objects of the present invention are also achieved by the electronic apparatus as described above, wherein the supporting mechanism comprises an engaging member engaging the main unit and the input device.

According to the invention described above, the input device can be more securely and more strongly stored between the display unit and the main unit.

It should be noted that the above-described engaging member can be composed of either a hook or a recessed portion engaging a projection or a hook.

Additionally, the above-described objects of the present invention are also achieved by the electronic apparatus as descried above, wherein the engaging member is mounted so as to be storable in the main unit when the input device is not being stored.

According to the invention described above, the engaging member does not become an obstruction and thereby damage either the main unit or the display device. Moreover, the aesthetic appearance of the electronic apparatus as a whole is further improved because the main unit engaging member does not intrude upon the user's vision.

It should be noted that the above-described engaging member and the above-described supporting member may be used in combination, such that the input device can be more strongly and more securely stored between the main unit and the display unit.

Additionally, the above-described objects of the present invention are also achieved by the electronic apparatus as described above, further comprising:

at least one detector detecting each of a storage and a removal operation of the input device; and control means controlling a predetermined operation of the electronic apparatus according to a signal of the detector.

According to the invention described above, the user of the electronic apparatus can freely select a variety of desired operations to be controlled by the signal of the detector.

For example, in the case of a configuration set to control a suspend mode, that is, an energy-saving standby mode, the apparatus can be put into the standby mode according to the detector signal triggered when the input device is stored and the apparatus can be released from the standby mode according to the detector signal triggered when the input device is removed for use. As a result, it is no longer necessary to shut off the power when the input device is stored and to turn on the power when the input device is removed. Rather, the apparatus can be switched directly to the standby mode by storing the input device and can be put directly into an operating mode by removing the input device.

Additionally, according to the conventional input device storage structure the input device is attached to and stored on the front surface of the display unit, in which case the display unit cannot be used. By contrast, according to the present invention it is possible to store the input device and thereby obtain additional desktop space, in which state an additional auxiliary input device separate from the original input device can be used to operate the electronic apparatus.

Additionally, the burning of an image onto the display screen can be avoided, for example, if the electronic apparatus is configured so that a screen saver is activated by the detector signal triggered when the input device is stored. Similarly, a web browser can be activated by a detector signal triggered when the input device is stored, thereby making it possible to access the internet without the need to use the input device and thus freeing additional desktop space for use which would otherwise be occupied by the input device.

Additionally, for example, it is possible to configure the electronic apparatus so that an e-mail program, a word processing program, a spreadsheet program or some other desired application is immediately activated by the detector signal triggered by the removal of the input device when the electronic apparatus is being readied for use.

Additionally, the above-described objects of the present invention are also achieved by an input device detachably connected to an electronic apparatus, the electronic apparatus comprising a main unit and a display unit rotatably attached to the main unit, the input device comprising:

at least one engaging member engaging the main unit so that the input device is retained between the display unit and the main unit.

According to the invention described above, the input device can be applied with optimum efficiency to the electronic apparatus of the present invention.

Other objects, features and advantages of the present invention will become more apparent from the following detailed description when read in conjunction with the accompanying drawings.

BRIEF DESCRIPTION OF THE DRAWINGS

FIGS. 4A and 4B are front and side views, respectively, of the personal computer according to a first embodiment of the present invention for the purpose of explaining a storage state of a keyboard;

FIGS. 5A and 5B are front and side views, respectively, of the personal computer according to a first embodiment of the present invention for the purpose of explaining a usage state of a keyboard;

FIGS. 6A and 6B are enlarged views of a personal computer main unit for the purpose of explaining an operation of a supporting member according to a first embodiment of the present invention;

FIGS. 7A and 7B show a tilt mechanism according to a first embodiment of the present invention;

FIGS. 8A and 8B are partial side views of a personal computer showing a storage state of a keyboard and a usage state of a keyboard, respectively, for the purpose of explaining a first variation of a personal computer according to a first embodiment of the present invention;

DESCRIPTION OF THE PREFERRED EMBODIMENTS

Figure 1:
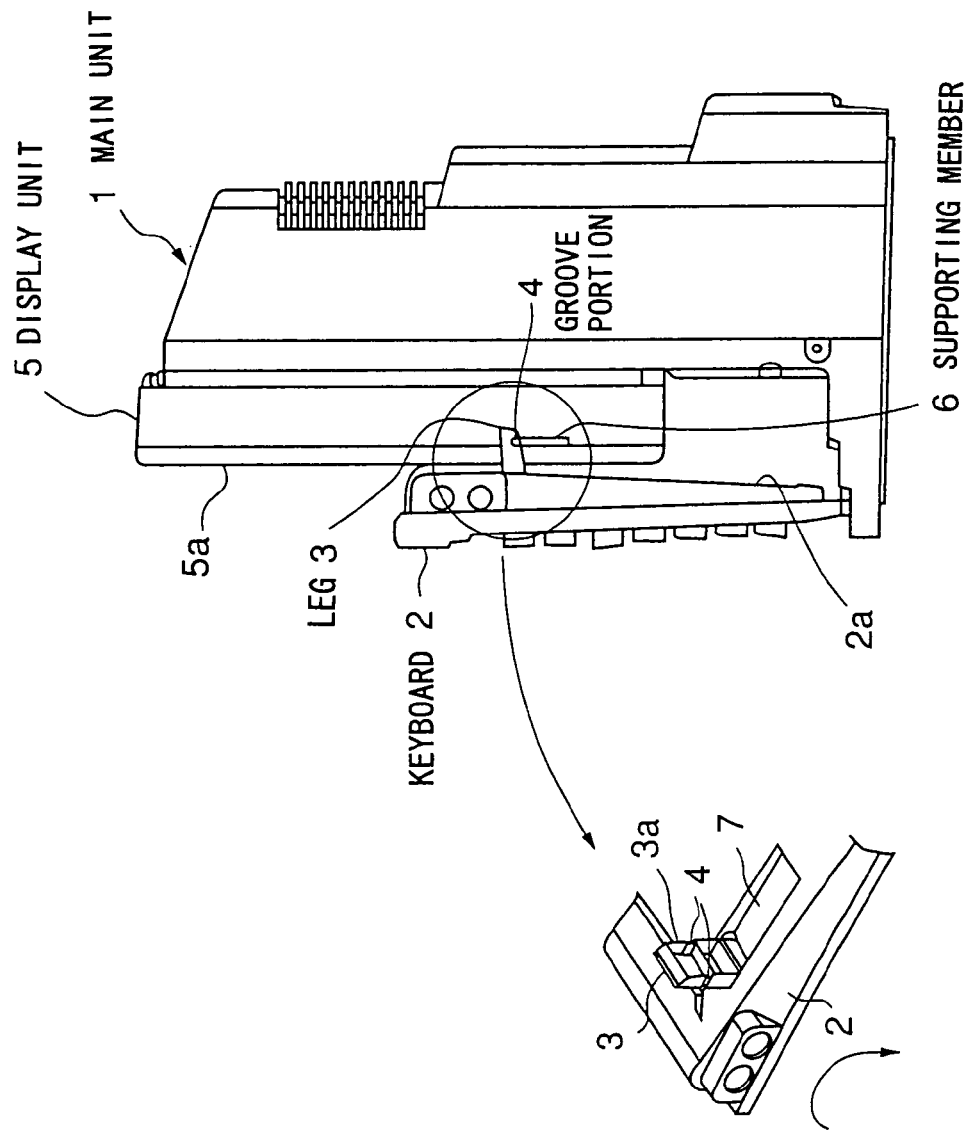
FIG. 1 is a side view of a conventional personal computer.
Figure 2:
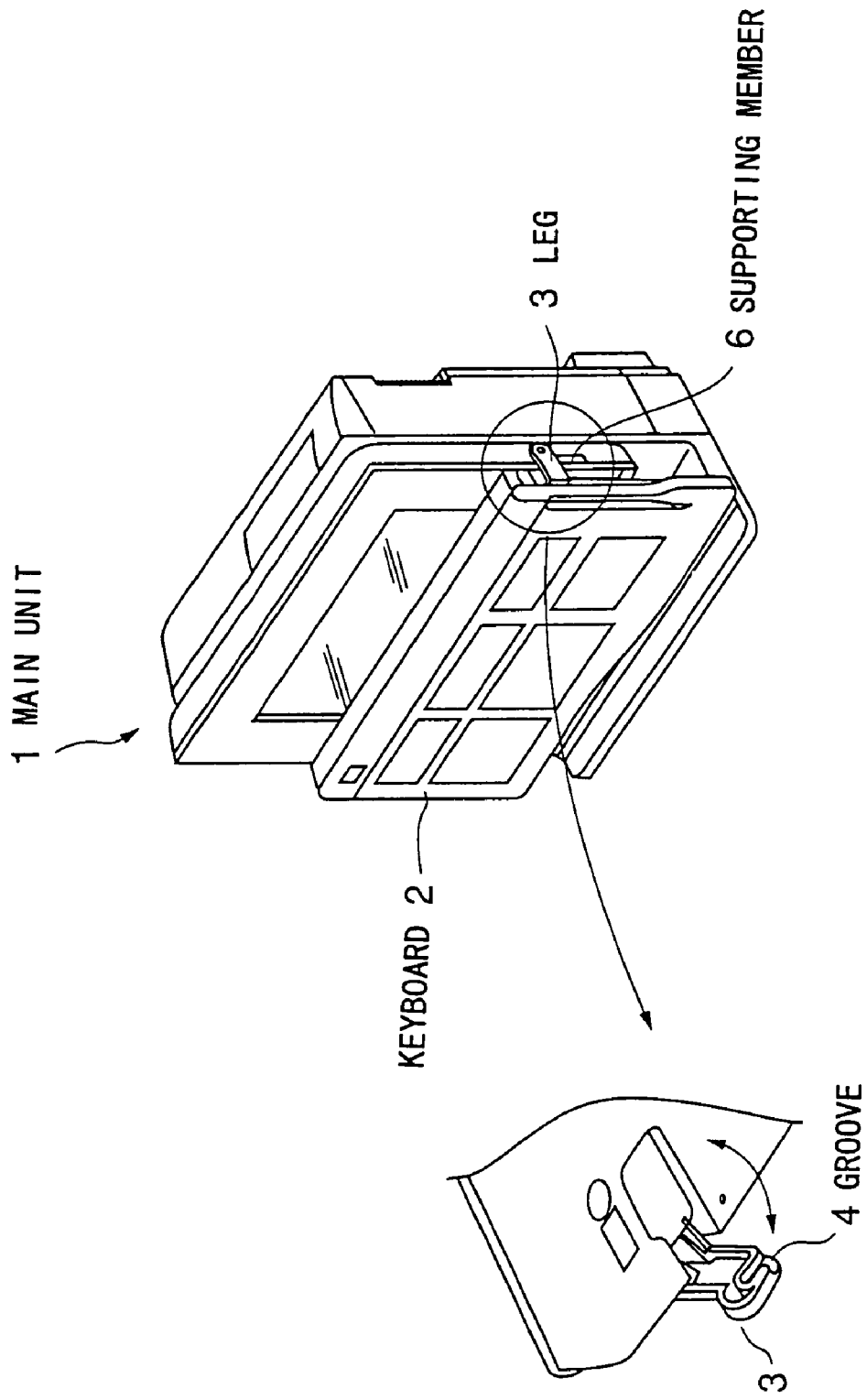
FIG. 2 is a perspective view of a conventional personal computer.
Figure 3:
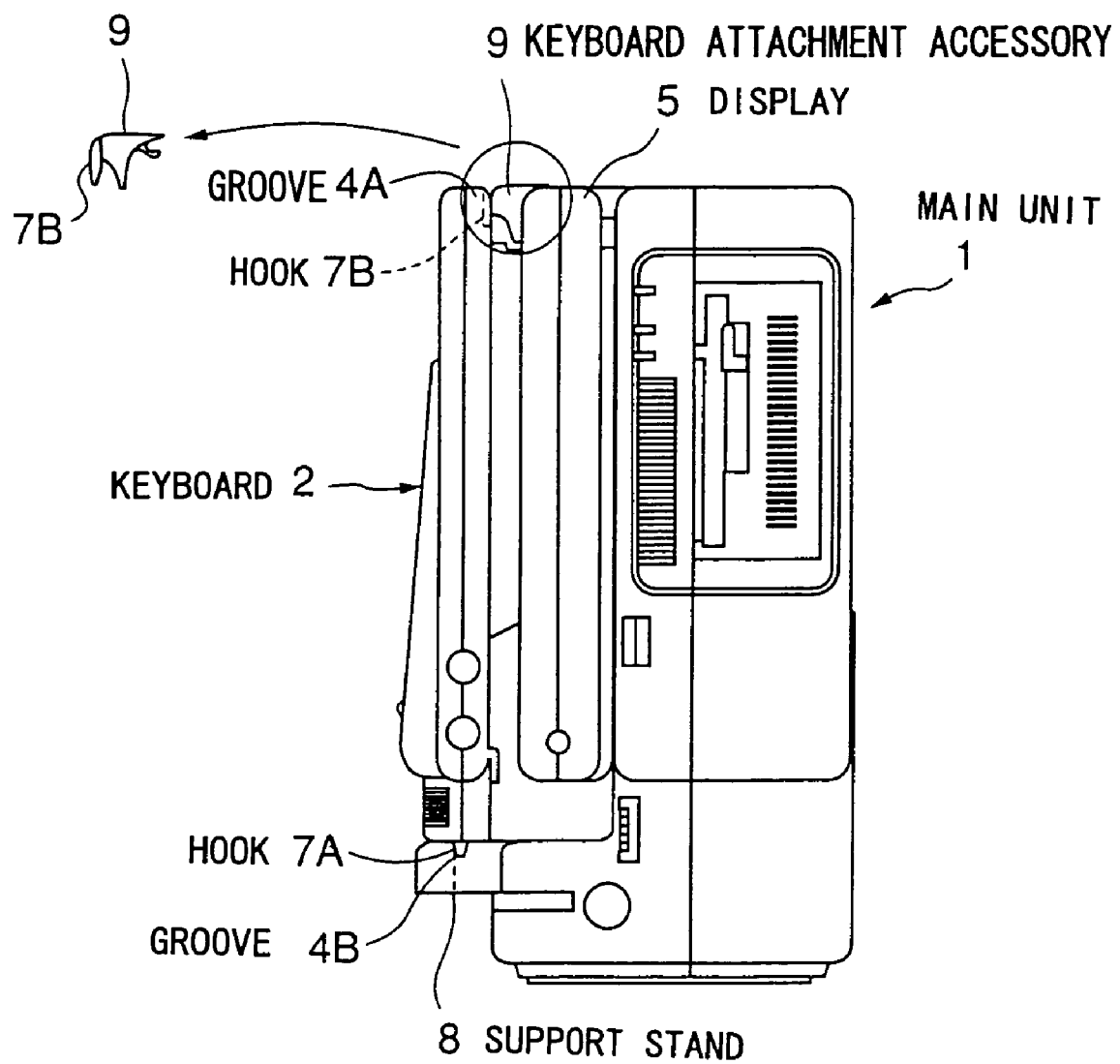
FIG. 3 is a side view of another conventional personal computer.

A description will now be given of embodiments of the present invention with reference to the accompanying drawings, specifically in the first instance FIGS. 4A, 4B, 5A, 5B, 6A, 6B, 7A and 7B.

FIGS. 4A, 4B, 5A, 5B, 6A, 6B, 7A and 7B are diagrams for describing a desktop personal computer, hereinafter referred to as a personal computer, according to a first embodiment of the present invention. FIGS. 4A and 4B are front and side views, respectively, of a personal computer according to a first embodiment of the present invention for the purpose of explaining a storage state of a keyboard. FIGS. 5A and 5B are front and side views, respectively, of the personal computer according to a first embodiment of the present invention for the purpose of explaining a usage state of a keyboard. FIGS. 6A and 6B are enlarged views of a personal computer main unit for the purpose of explaining an operation of a supporting member according to a first embodiment of the present invention. FIGS. 7A and 7B show a tilt mechanism according to a first embodiment of the present invention.

The personal computer 10 comprises a keyboard 16 and a main unit 14 on a front surface 14a of which a liquid crystal display panel 12 is provided. The liquid crystal display panel 12, hereinafter referred to as a display unit, has a top part that engages a top part of the main unit 14 via a tilt mechanism 18, such that the display unit 12 is rotatably mounted about the tilt mechanism 18. For ease of explanation the tilt mechanism 18 will be described later. At least one supporting member 20 is storably provided on the front surface 14a of the main unit 14. For ease of explanation the supporting member 20, too, will be described later. The keyboard 16 is connected to the main unit 14 by a connection cable not shown in the drawing. Additionally, an auxiliary input device such as a mouse not shown in the drawing may also be connected to the main unit 14 by a separate connection cable.

A description will now be given of a sequence for storing the keyboard 16, with reference to FIGS. 4A and 4B which show a storage state of the keyboard 16. First, the display unit 12 is rotated so as to be lifted in an upper left direction as seen from the diagram so as to form a space between a back surface 12b of the display unit 12 and the front surface 14a of the main unit 14, the keyboard 16 is positioned in this space and a bottom portion of the keyboard 16 is supported by the supporting member 20 projecting from the front surface 14a of the main unit 14. Next, the display unit 12 is rotated once again, this time in reverse and pressed slightly against the keyboard 16 so as to sandwich the keyboard 16 between the display unit 12 and the main unit 14. As a result, desktop space not shown in the diagram in front of the front surface 14a of the main unit 14 that would normally be occupied by the keyboard 16 is now freed for other use. Additionally, unlike with the conventional arrangement, the front surface 12a of the display unit 12 remains unobstructed because the keyboard 16 is stored between the display unit 12 and the main unit 14. Accordingly, the display unit 12 can still be used even when the keyboard 16 is stored out of the way.

When using the keyboard 16, as shown in FIGS. 5A and 5B the display unit 12 is rotated upward and outward so as to separate the display unit 12 from the keyboard 16, after which the keyboard 16 is removed from the main unit 14 and positioned in front of the front surface 14a of the main unit 14 in such a way that the keyboard 16 is easy to use for the user. At the same time, the supporting member 20 is folded upward and out of the way so as to no longer project from the front surface 14a of the main unit 14. In the configuration shown in FIGS. 5A and 5B, the display unit 12 is rotated downward so as to be substantially vertical, with the back surface 12b of the display unit 12 left in a state of contact with the front surface 14a of the main unit 14.

It should be noted that the display unit 12 is not limited to the above-described position but may be rotated upward to any position that is comfortable for a user seated at the keyboard 16.

A more detailed description will now be given of the supporting member 20 supporting the bottom portion of the keyboard 16.

The supporting member 20 shown in FIGS. 6A and 6B comprises a projecting portion 20a and further a hook-shaped engaging portion 20b located at the tip of the projecting portion 20a. A hinge 22 is mounted on the front surface 14a of the main unit 14, with a recessed portion 24 formed on an upper portion of the hinge 22. A rear edge of the supporting member 20 engages the hinge 22.

In the keyboard 16 storage state shown in FIG. 6A, the keyboard 16 is supported by the projecting portion 20a of the supporting member 20 projecting from the front surface 14a of the main unit 14 when the supporting member 20 is swung open horizontally about the hinge 22. Further, a bottom edge of a back surface of the keyboard 16, that is, the surface opposite the surface on which the keys of the keyboard 16 are disposed, is securely engaged by the engaging portion 20b.

In the keyboard 16 usage state shown in FIG. 6B, the supporting member 20 is swung shut and stored in the recessed portion 24. As a result, the supporting member 20 does not remain as an obstruction on the front surface 14a of the main unit 14 and thus does not pose any danger of damaging either the main unit 14 or the display unit 12. Additionally, the back surface 12b of the display unit 12 can be directly contacted against the front surface 14a of the main unit 14.

It should be noted that the operations of storing and removing the supporting member 20 can be performed with ease because the supporting member 20 is mounted on the front surface 14a of the main unit 14.

A description will now be given of the tilt mechanism 18 that integrates the display unit 12 with the personal computer main unit 14, with reference to FIGS. 7A and 7B. It should be noted that the tilt mechanism 18 also makes it possible to rotate the display unit 12 so as to change the degree of inclination or tilt of the display unit 12 to a desired angle.

As an initial matter, it should be noted that the tilt mechanism 18 comprises a tilt member 26 and a tilt member mounting member 28.

The tilt member 26 comprises a shaft 26a, a plurality of bearing members 26b, 26c and 26d supporting the shaft 26a and a plurality of leaf springs 26e. The tilt member 26 is mounted on the tilt member mounting member 28 by installing the shaft 26a on the plurality of bearing members 26b, 26c and 26d, passing a tip of the shaft 26a through a recessed portion 30 formed in the tilt mechanism mounting member 28, connecting the tip of the shaft 26a to the plurality of leaf springs 26e and securing the leaf springs 26e to a mounting position. A top surface of the member 26b that forms part of the tilt member 26 that in turn forms part of the tilt mechanism 18 is mounted on the back surface 12b of the display panel 12. At the same time, a bottom surface of the tilt member mounting member 28 is mounted on the front surface 14a of the main unit 14.

According to the above-described structure, the display unit 12 rotates about the tilt mechanism 18 in the directions indicated by the arrow shown in FIG. 7B, such that by manually tilting the display unit 12 to a desired position the frictional effect of the leaf springs 26e maintains the display unit 12 at that desired angle of inclination. Accordingly, in a state in which the keyboard 16 is positioned between the display unit 12 and the main unit 14, the back surface 12b of the display unit 12 presses against the keyboard 16 so as to securely retain the keyboard 16 between the display unit 12 and the main unit 14.

According to the personal computer according to the first embodiment of the present invention as described above, when the keyboard 16 is not in use the keyboard 16 can be securely stored between the display unit 12 and the main unit 14 in such a way that the keyboard does not come loose from the personal computer 10 by the force of some shock applied against the personal computer 10. As a result, more efficient use can be made of the desktop space that the keyboard 16 would otherwise occupy, and at the same time the aesthetic appearance of the personal computer 10 as a whole is improved because the keyboard 16 is not mounted on the front surface 12a of the display unit 12 when the keyboard 16 is stored.

A description will now be given of a variation of the personal computer according to the first embodiment of the present invention, with reference to FIGS. 8A and 8B.

According to this variation, the hinge mechanism of the supporting member 20 of the above-described first embodiment is replaced by a slide mechanism. It should be noted that, in principle, parts of this variation as well as all subsequent embodiments described hereinafter that are identical to corresponding parts of the first embodiment as described above are given identical reference numerals.

As shown in FIG. 8A, a supporting member 32 comprises a projection 32a, on a front edge portion of which a hook-shaped engaging member 32b is formed. Additionally, engaging portions 32c extend from both side surfaces near a back edge portion of the supporting member 32. At the same time, a recessed portion 34 is formed on the front surface 14a of the main unit 14, on both sides of which are formed rail-shaped grooves 34a that engage the engaging portions 32c. In a state in which the supporting member 32 is inserted in the recessed portion 34 and the engaging portions 32c engage the rail-shaped grooves 34a, an opening part of the recessed portion 34 retains room to penetratingly insert the projection 32a of the supporting member 32 so as to accommodate the engaging member 32b. It should be noted that the engaging portions 32c are provided in order to keep the supporting member 32 from falling out when removed, that is, pulled out, to support the display unit 12.

A description will now be given of the operation of the supporting member 32 when the keyboard 16 is stored, with reference to the keyboard storage state shown in FIG. 8A. The supporting member 32, of which there is at least one, is retracted from the recessed portion 34 by the slide mechanism, the bottom of the keyboard 16 is supported by the projection 32a and the bottom edge of the back surface 16b of the keyboard 16 is securely engaged by the engaging portion 32b.

Additionally, the supporting member 32 is completely contained within the recessed portion 34 when the keyboard 16 is in use and thus is not an obstruction. Accordingly, there is no danger that either the main unit 14 or the display unit 12 will be damaged, and moreover the aesthetic appearance of the personal computer 10 is improved because the supporting member does not intrude upon the user's field of vision.

Figure 9:
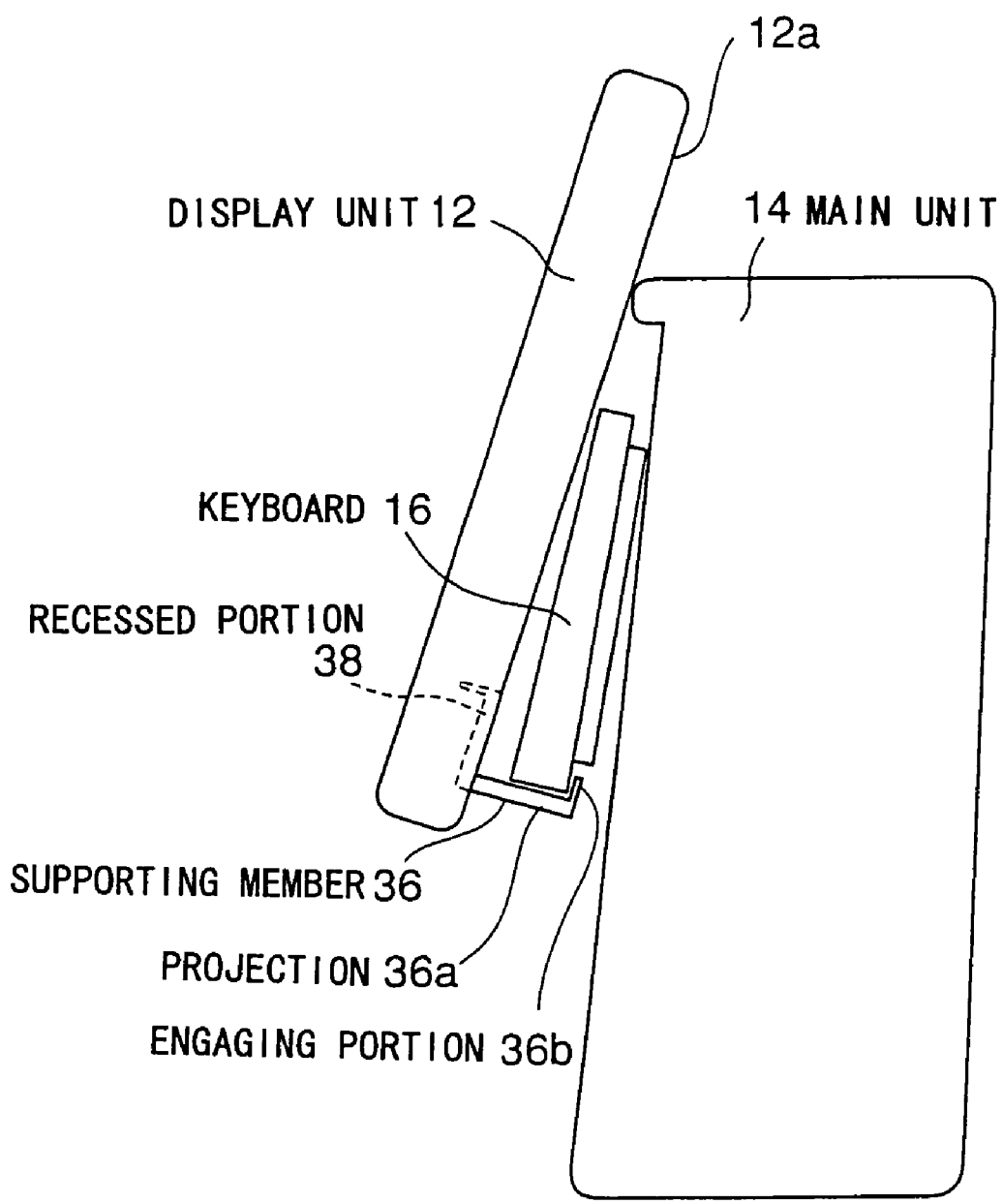
FIG. 9 is a side view of a personal computer according to a second embodiment of the present invention, for the purpose of explaining a storage state of a keyboard.
Figure 10:
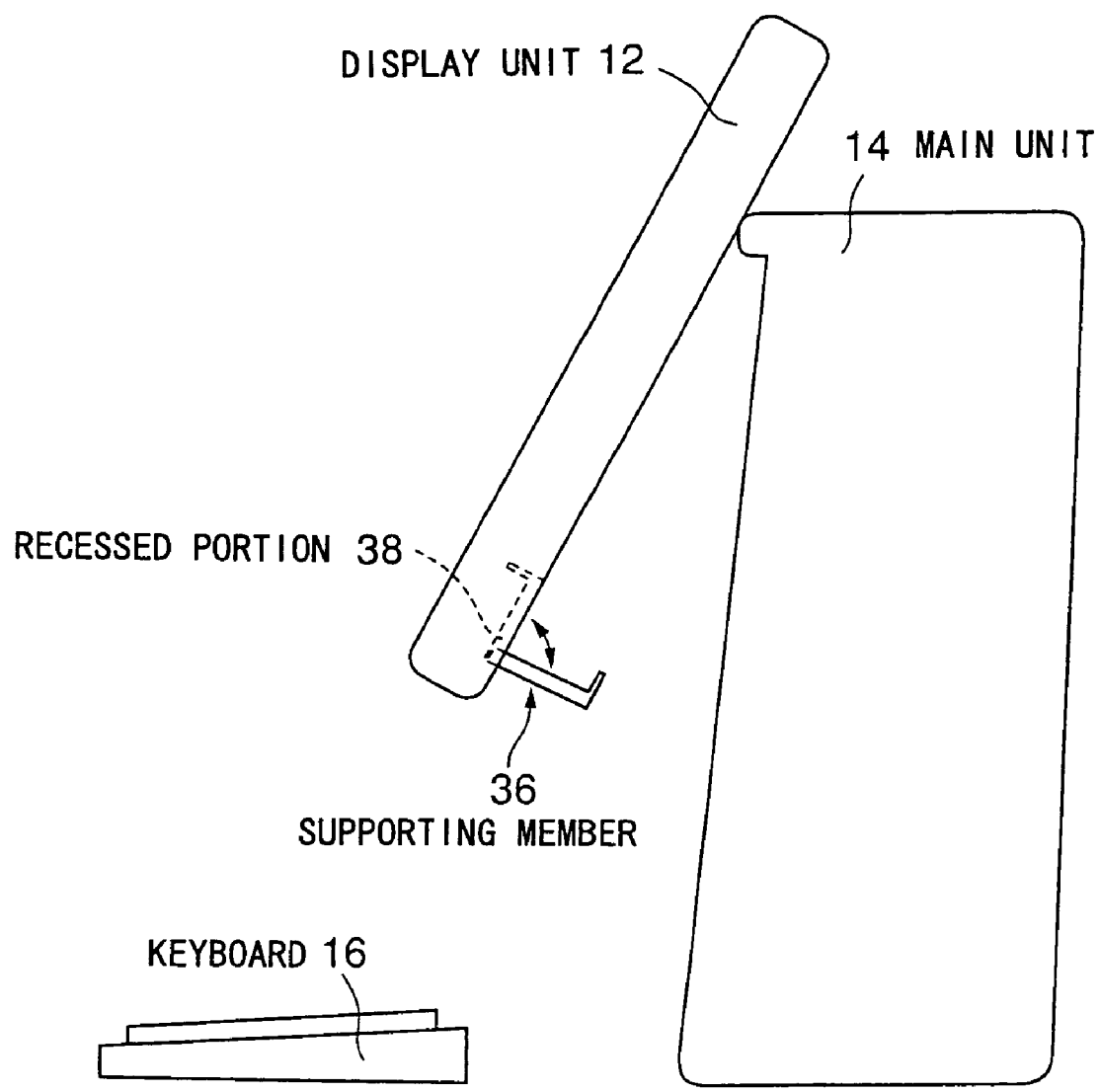
FIG. 10 is a side view of a personal computer according to a second embodiment of the present invention, for the purpose of explaining a usage state of a keyboard.

Next, a description will be given of a personal computer according to a second embodiment of the present invention, with reference to FIG. 9 and FIG. 10. FIG. 9 is a side view of the personal computer according to the second embodiment of the present invention, for the purpose of explaining a storage state of a keyboard. FIG. 10 is a side view of the personal computer according to the second embodiment of the present invention, for the purpose of explaining a usage state of the keyboard.

In the second embodiment of the present invention, at least one supporting member 36 comprising a projection 36a and a hook-shaped engaging portion 36b is provided on a bottom edge of the back surface 12b of the display unit 12 so as to be swung into and storable within a recessed portion 38 formed in the back surface 12b of the display unit 12 via a hinge mechanism.

A description will now be given of a sequence for storing the keyboard 16, with reference to FIG. 9 which shows a storage state of the keyboard 16. First, the display unit is rotated upward and outward to form a space between the back surface 12b of the display unit 12 and the front surface 14a of the main unit 14. The keyboard 16 is then positioned within the space so formed, with a bottom portion of the keyboard 16 supported by the supporting member 36 provided on the display unit 12. The display unit 12 is then rotated so as to press slightly against the keyboard 16, thereby sandwiching and storing the keyboard 16 between the display unit 12 and the main unit 14.

FIG. 10 shows a state in which the keyboard 16 is removed for use, with the supporting member 36 stored within the hole 38 of the display unit 12.

Accordingly, the same effects and advantages as those obtained with the personal computer according to the first embodiment of the present invention can be obtained with the personal computer according to the above-described second embodiment of the present invention. In particular, the aesthetic appearance of the personal computer 10 is further improved insofar as the supporting member 36 is provided on the back surface 12*b* of the display unit 12 and thus does not intrude upon the user's field of vision.

Figure 11:
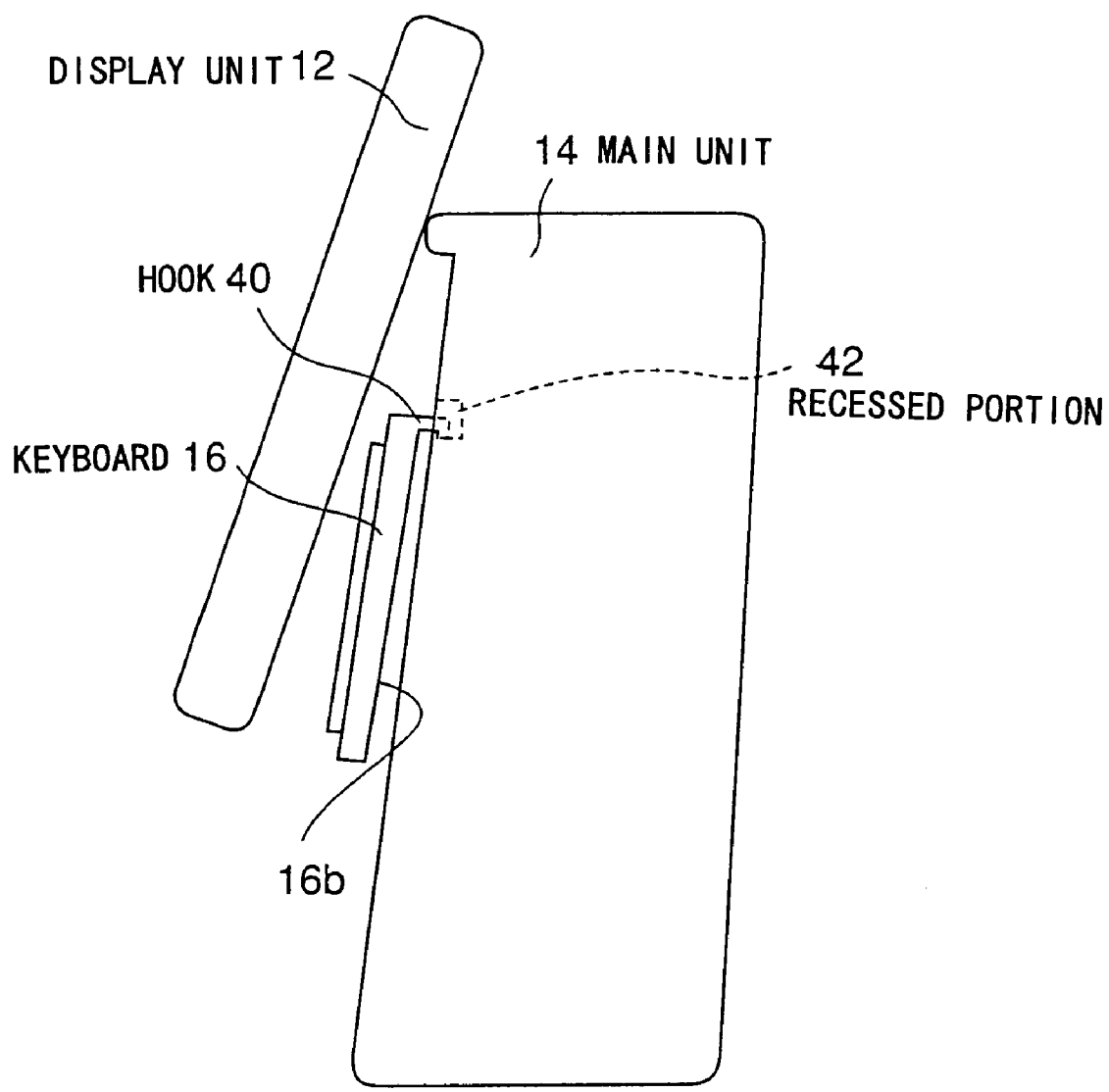
FIG. 11 is a side view of a personal computer according to a third embodiment of the present invention, for the purpose of explaining a storage state of a keyboard.
Figure 12:
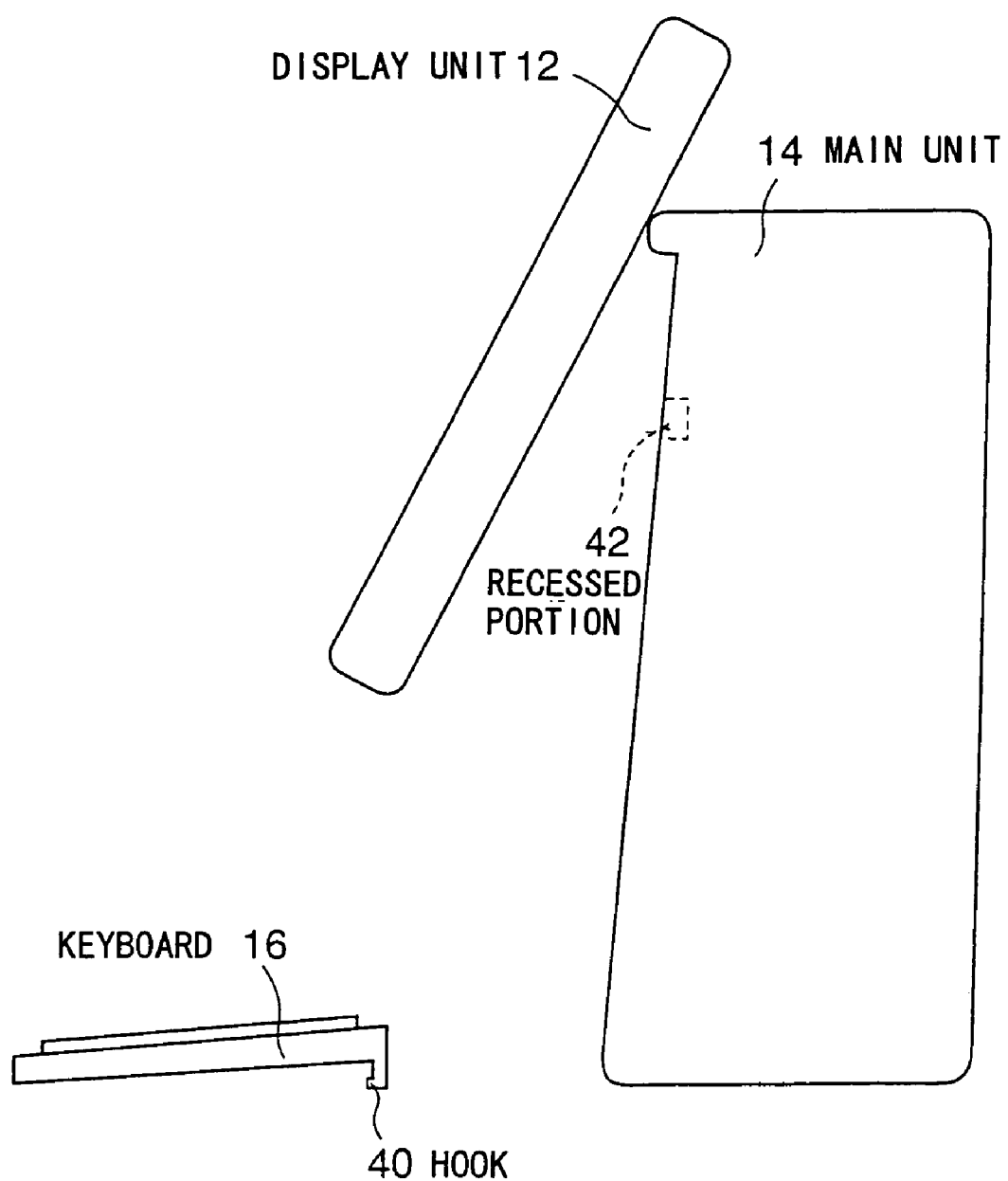
FIG. 12 is a side view of a personal computer according to a third embodiment of the present invention, for the purpose of explaining a usage state of a keyboard.

Next, a description will be given of a personal computer according to a third embodiment of the present invention, with reference to FIGS. 11 and 12. FIG. 11 is a side view of the personal computer according to the third embodiment of the present invention, for the purpose of explaining a storage state of a keyboard. FIG. 12 is a side view of the personal computer according to the third embodiment of the present invention, for the purpose of explaining a usage state of the keyboard.

In the third embodiment of the present invention, the supporting members 20 and 36 of the above-described first and second embodiments, respectively, are replaced by engaging members by which the keyboard 16 is slung from the front surface 14*a* of the main unit 14.

Hooks 40 are provided as engaging members on a top edge of the back surface 16*b* of the keyboard 16, with recessed portions 42 as engaging members formed in the front surface 14*a* of the main unit 14.

A description will now be given of a sequence for storing the keyboard 16, with reference to FIG. 11 which shows a storage state of the keyboard 16. First, the display unit is rotated upward and outward to form a space between the back surface 12*b* of the display unit 12 and the front surface 14*a* of the main unit 14. The keyboard 16 is then positioned within the space so formed, with the hooks 40 of the keyboard 16 engaging the recessed portions 42 of the main unit 14 so that the keyboard 16 is slung on the main unit 14. The display unit 12 is then rotated so as to press slightly against the keyboard 16, thereby sandwiching and storing the keyboard 16 between the display unit 12 and the main unit 14.

Referring to FIG. 12, it can be appreciated that when the keyboard 16 is removed for use, the hooks 40 of the keyboard 16 function as projections that raise a top edge of the keyboard 16 slightly so as to facilitate use of the keyboard 16 by the user.

Accordingly, the same effects and advantages as those obtained with the personal computer according to the first embodiment of the present invention can be obtained with the personal computer according to the above-described third embodiment of the present invention.

Figure 13:
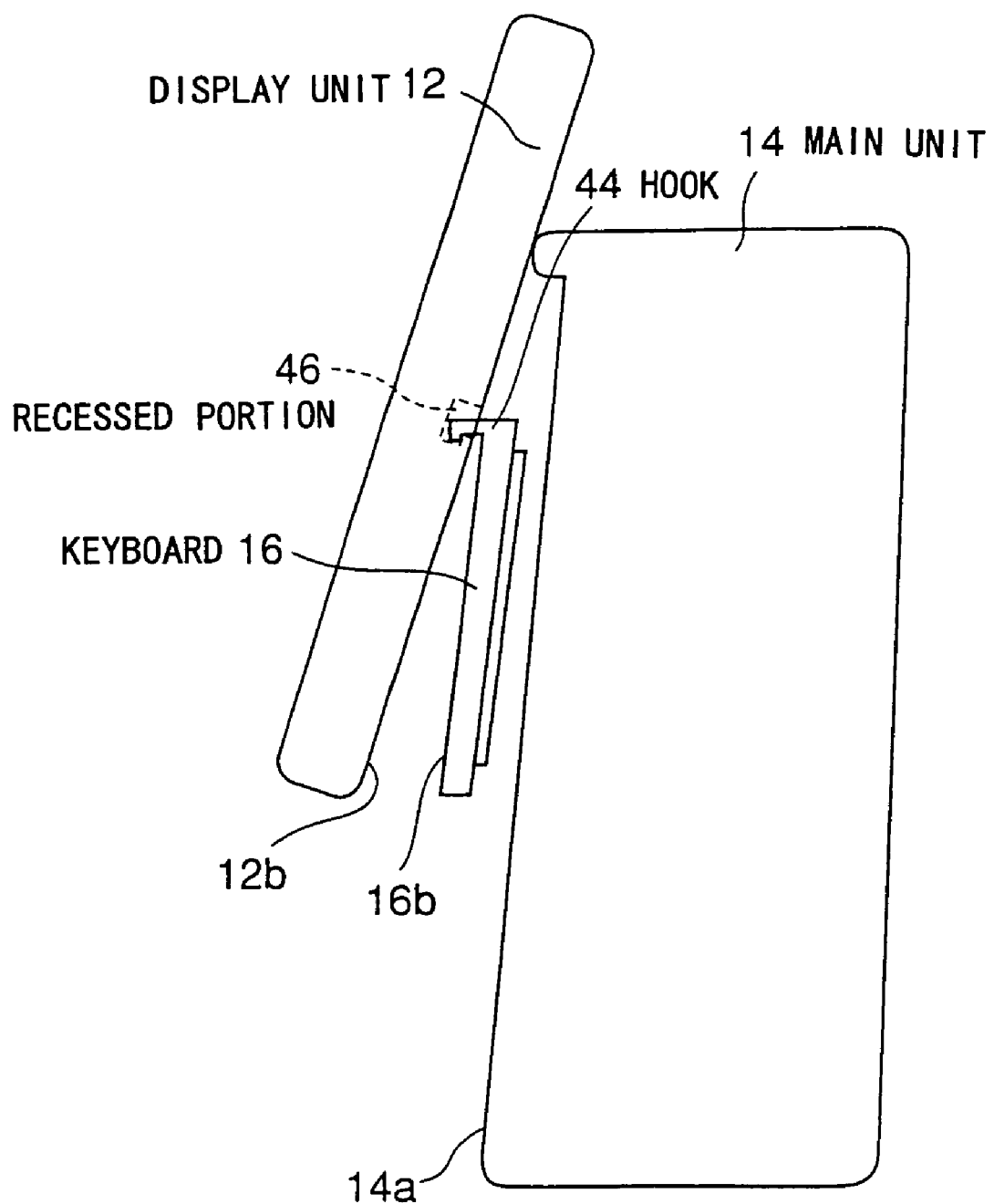
FIG. 13 is a side view of a personal computer according to a fourth embodiment of the present invention, for the purpose of explaining a storage state of a keyboard.
Figure 14:
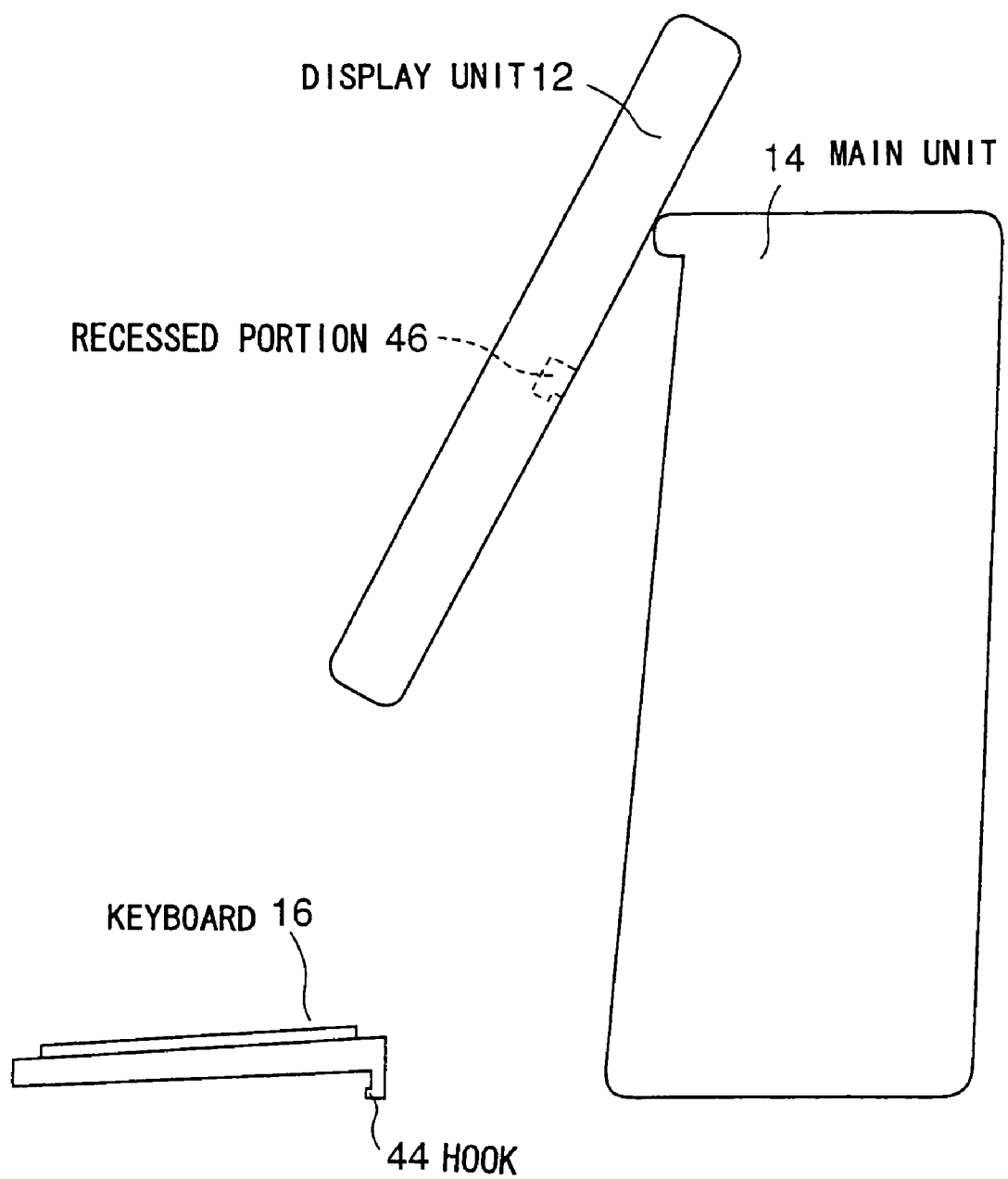
FIG. 14 is a side view of a personal computer according to a fourth embodiment of the present invention, for the purpose of explaining a usage state of a keyboard.

Next, a description will be given of a personal computer according to a fourth embodiment of the present invention, with reference to FIGS. 13 and 14. FIG. 13 is a side view of the personal computer according to the fourth embodiment of the present invention, for the purpose of explaining a storage state of a keyboard. FIG. 14 is a-side view of the personal computer according to the fourth embodiment of the present invention, for the purpose of explaining a usage state of the keyboard.

Unlike in the third embodiment of the present invention as described above, in the fourth embodiment of the present invention the recessed portions that form one half of the engaging members are formed on the display unit 12 instead of the main unit 14.

In other words, hooks 44 are provided as engaging members on the top edge of the back surface 16*b* of the keyboard 16. At the same time, recessed portions 46 are formed in a center part of the back surface 12*b* of the display unit 12.

A description will now be given of a sequence for storing the keyboard 16, with reference to FIG. 13 which shows a storage state of the keyboard 16. First, the display unit is rotated upward and outward to form a space between the back surface 12*b* of the display unit 12 and the front surface 14*a* of the main unit 14. The keyboard 16 is then positioned within the space so formed, with the hooks 44 of the keyboard 16 engaging the recessed portions 46 of the main unit 14 so that the keyboard 16 is slung on the display unit 12. The display unit 12 is then rotated so as to press slightly against the keyboard 16, thereby sandwiching and storing the keyboard 16 between the display unit 12 and the main unit 14.

Referring to FIG. 14, it can be appreciated that when the keyboard 16 is removed for use, the hooks 44 of the keyboard 16 function as projections that raise a top edge of the keyboard 16 slightly so as to facilitate use of the keyboard 16 by the user.

Accordingly, the same effects and advantages as those obtained with the personal computer according to the first embodiment of the present invention can be obtained with the personal computer according to the above-described fourth embodiment of the present invention.

Figure 15:
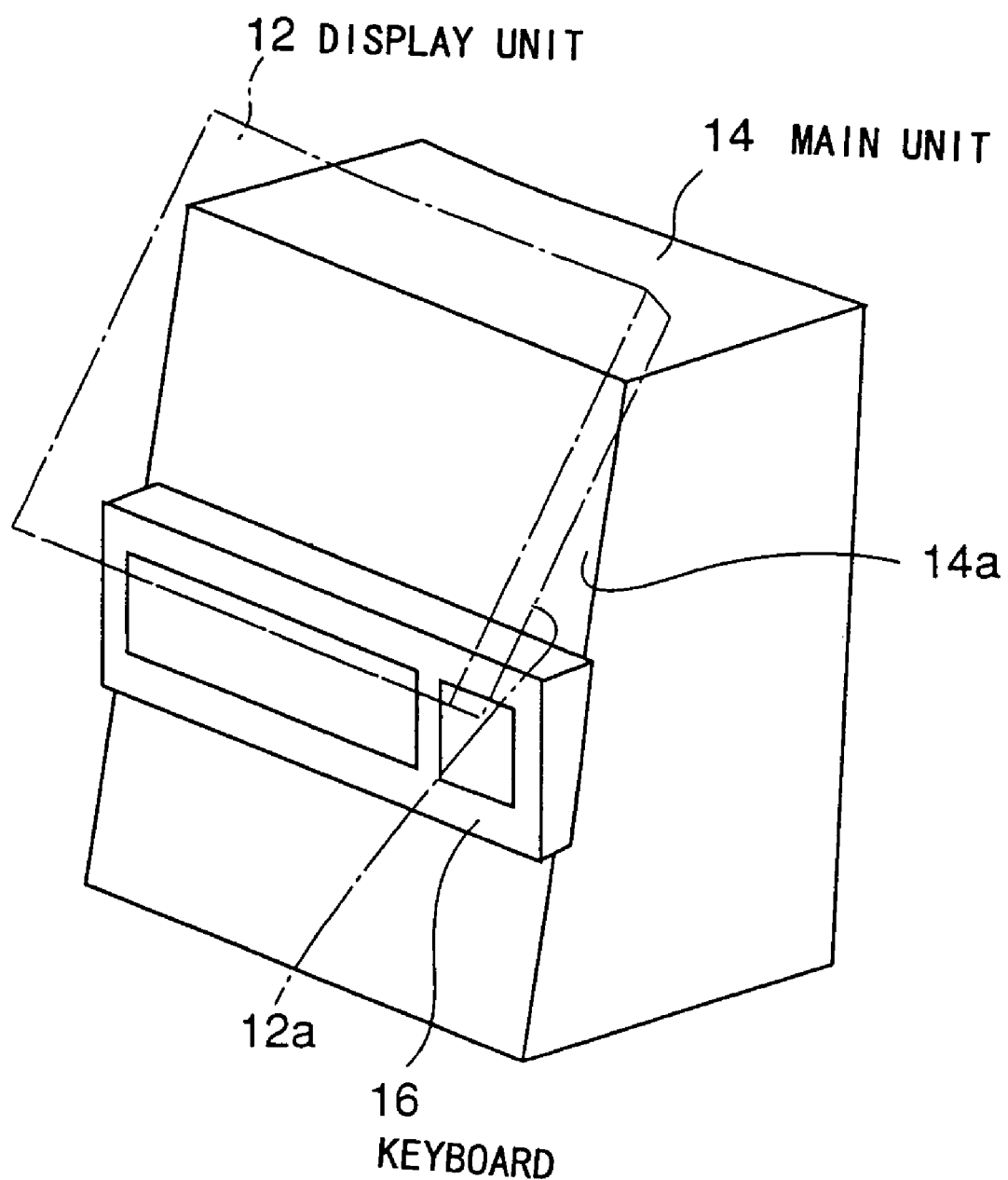
FIG. 15 is a perspective view of a personal computer according to a fifth embodiment of the present invention, for the purpose of explaining a storage state of a keyboard.
Figure 16:
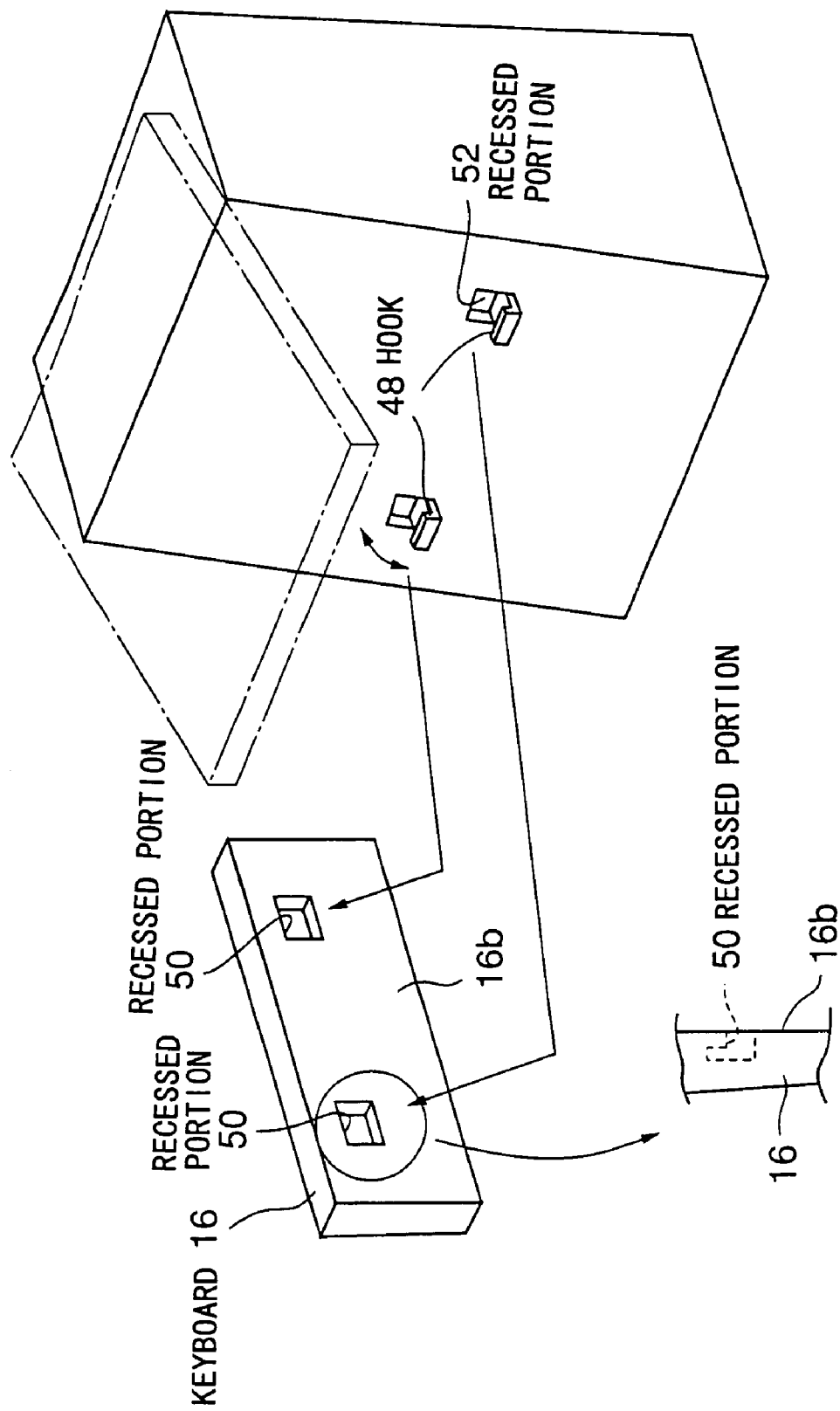
FIG. 16 is a perspective view of a personal computer with the keyboard removed according to a fifth embodiment of the present invention, for the purpose of explaining a storage state of a keyboard.

Next, a description will be given of a personal computer according to a fifth embodiment of the present invention, with reference to FIGS. 15 and 16. FIG. 15 is a perspective view of a personal computer according to a fifth embodiment of the present invention, for the purpose of explaining a storage state of a keyboard. FIG. 16 is a perspective view of a personal computer with the keyboard removed according to a fifth embodiment of the present invention, for the purpose of explaining a storage state of a keyboard.

Unlike in the third and fourth embodiments of the present invention as described above, in the fifth embodiment of the present invention the hooks that function as engaging members are provided on the main unit while the recessed portions that function as engaging members are formed on the keyboard.

In other words, a first set of rotatable hooks 48 rotated by a hinge mechanism is provided on the front surface 14*a* of the main unit 14 together with recessed portions 52 for storing the hooks 48. At the same time, recessed portions 50 having an L-shaped cross-section are formed on a back surface 16*b* of the keyboard 16.

A description will now be given of a sequence for storing the keyboard 16, with reference to FIG. 16 which shows a storage state of the keyboard 16. First, the display unit is rotated upward and outward to form a space between the back surface 12*b* of the display unit 12 and the front surface 14*a* of the main unit 14. The keyboard 16 is then positioned within the space so formed, with the hooks 48 of the main unit 14 engaging the recessed portions 50 of the keyboard 16 and the keyboard 16 slung on the main unit 14. The display unit 12 is then rotated so as to press slightly against the keyboard 16, thereby sandwiching and storing the keyboard 16 between the display unit 12 and the main unit 14.

As shown in FIG. 16, when the keyboard 16 is in a stored state the hooks 48 of the main unit 14 are opened so as to extend from the front surface 14a of the main unit 14, with the hooks 48 stored in the recessed portions 52 of the main unit 14 when the keyboard 16 is in a usage state not shown in the diagram.

Accordingly, the same effects and advantages as those obtained with the personal computer according to the first embodiment of the present invention can be obtained with the personal computer according to the above-described fifth embodiment of the present invention.

Figure 17:
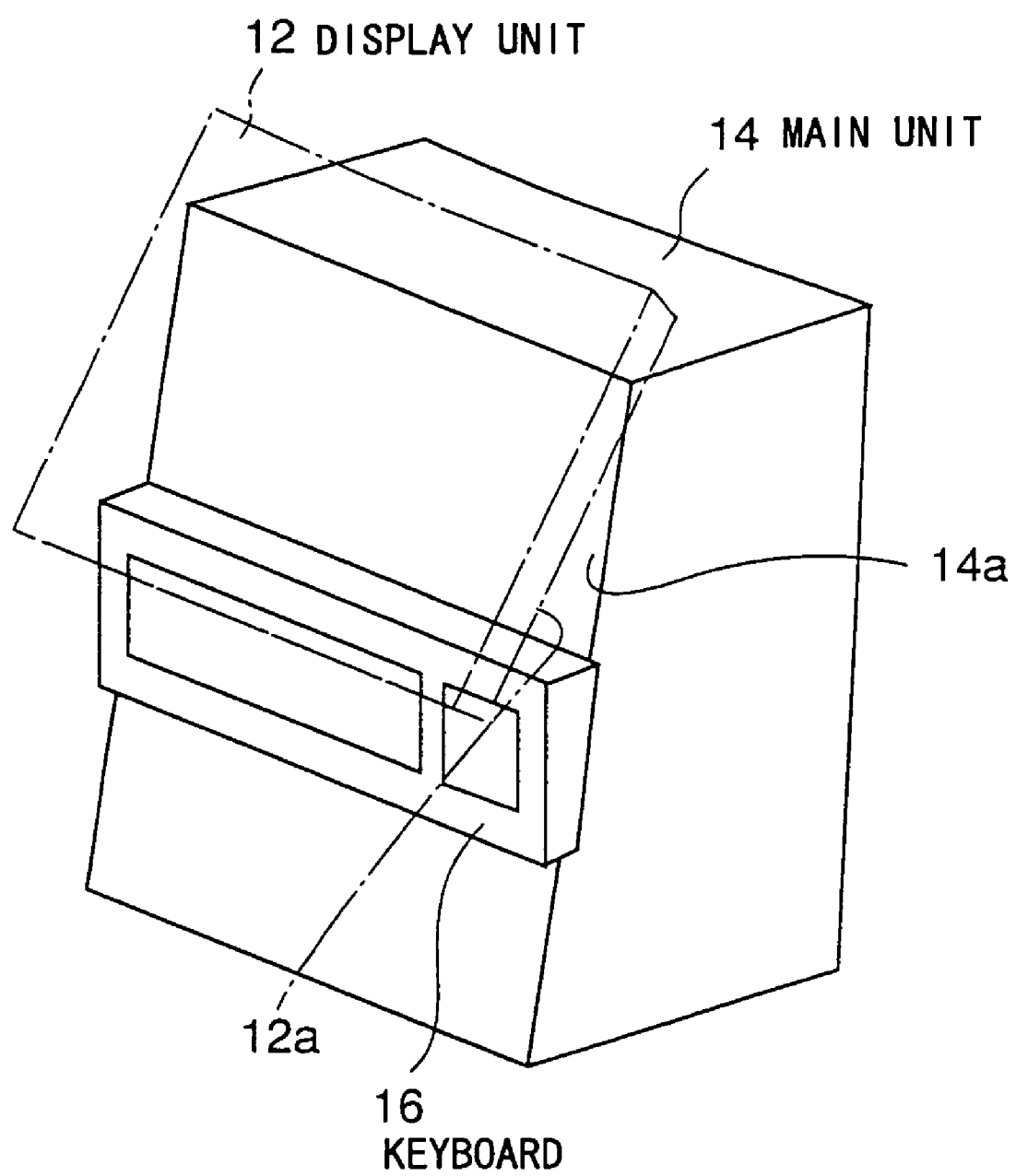
FIG. 17 is a perspective view of a personal computer according to a sixth embodiment of the present invention, for the purpose of explaining a storage state of a keyboard.
Figure 18:
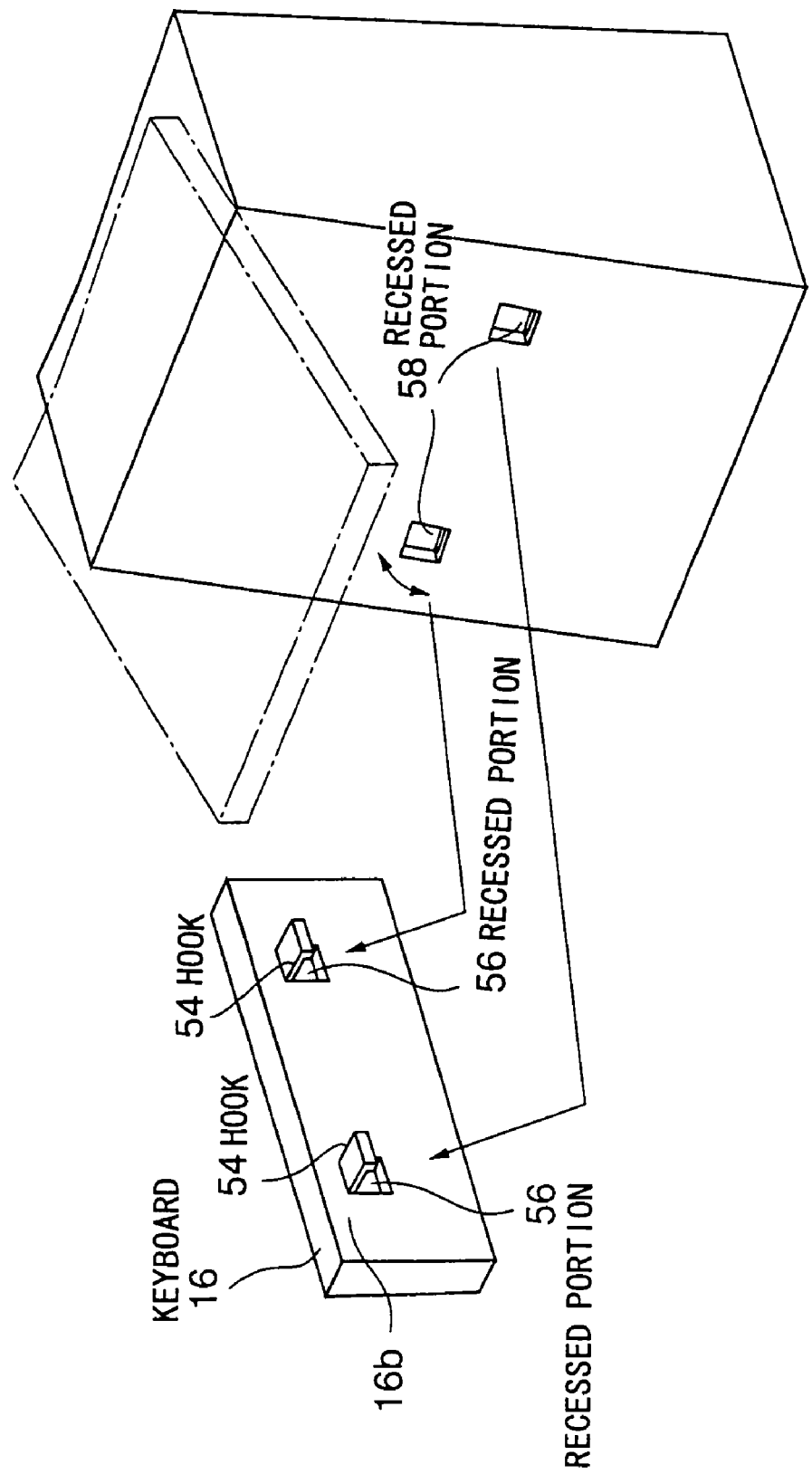
FIG. 18 is a perspective view of a personal computer with the keyboard removed according to a sixth embodiment of the present invention, for the purpose of explaining a storage state of a keyboard.

Next, a description will be given of a personal computer according to a sixth embodiment of the present invention, with reference to FIGS. 17 and 18. FIG. 17 is a perspective view of a personal computer according to a sixth embodiment of the present invention, for the purpose of explaining a storage state of a keyboard. FIG. 18 is a perspective view of a personal computer with the keyboard removed according to a sixth embodiment of the present invention, for the purpose of explaining a storage state of a keyboard.

Unlike in the fifth embodiment of the present invention as described above, in the sixth embodiment of the present invention the hooks that function as engaging members are provided on the keyboard while the recessed portions that function as engaging members are formed on the main unit.

In other words, rotatable hooks 54 rotated by a hinge mechanism are provided on the back surface 16b of the keyboard 16 together with recessed portions 56 for storing the hooks 54. At the same time, recessed portions 58 having an L-shaped cross-section are formed on a front surface 14a of the main unit 14.

A description will now be given of a sequence for storing the keyboard 16, with reference to FIG. 17 which shows a storage state of the keyboard 16. First, the display unit is rotated upward and outward to form a space between the back surface 12b of the display unit 12 and the front surface 14a of the main unit 14. The keyboard 16 is then positioned within the space so formed, with the hooks 54 of the keyboard 16 engaging the recessed portions 58 of the main unit 14 so that the keyboard 16 slung on the main unit 14. The display unit 12 is then rotated so as to press slightly against the keyboard 16, thereby sandwiching and storing the keyboard 16 between the display unit 12 and the main unit 14.

As shown in FIG. 18, when the keyboard 16 is in a stored state the hooks 54 of the keyboard 16 are opened so as to extend from the back surface 16b of the keyboard 16, with the hooks 54 stored in the recessed portions 56 of the keyboard 16 when the keyboard 16 is in a usage state not shown in the diagram.

Accordingly, the same effects and advantages as those obtained with the personal computer according to the fifth embodiment of the present invention can be obtained with the personal computer according to the above-described sixth embodiment of the present invention.

Figure 19:
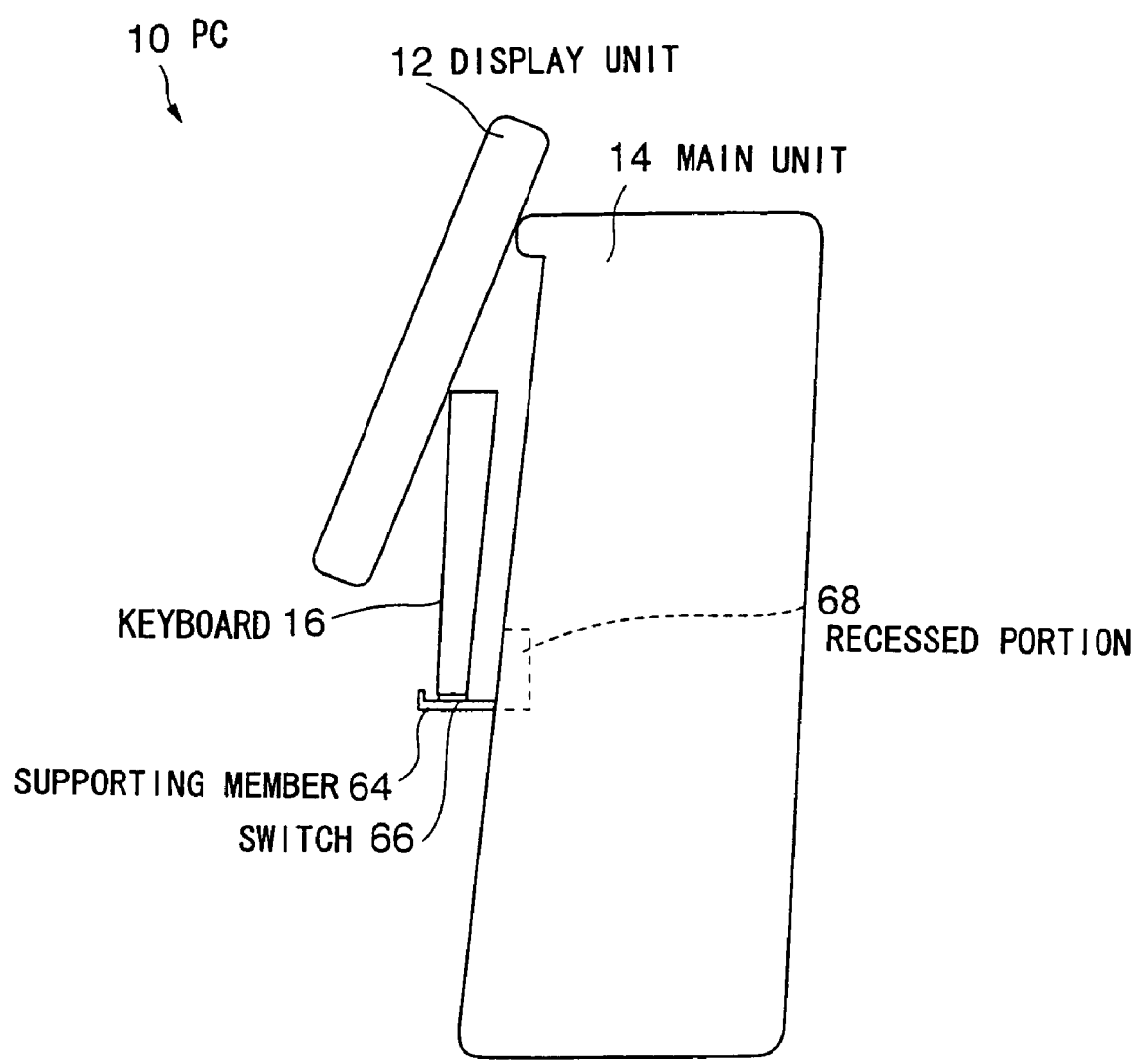
FIG. 19 is a side view of a personal computer according to a seventh embodiment of the present invention, for the purpose of explaining a storage state of a keyboard.
Figure 20:
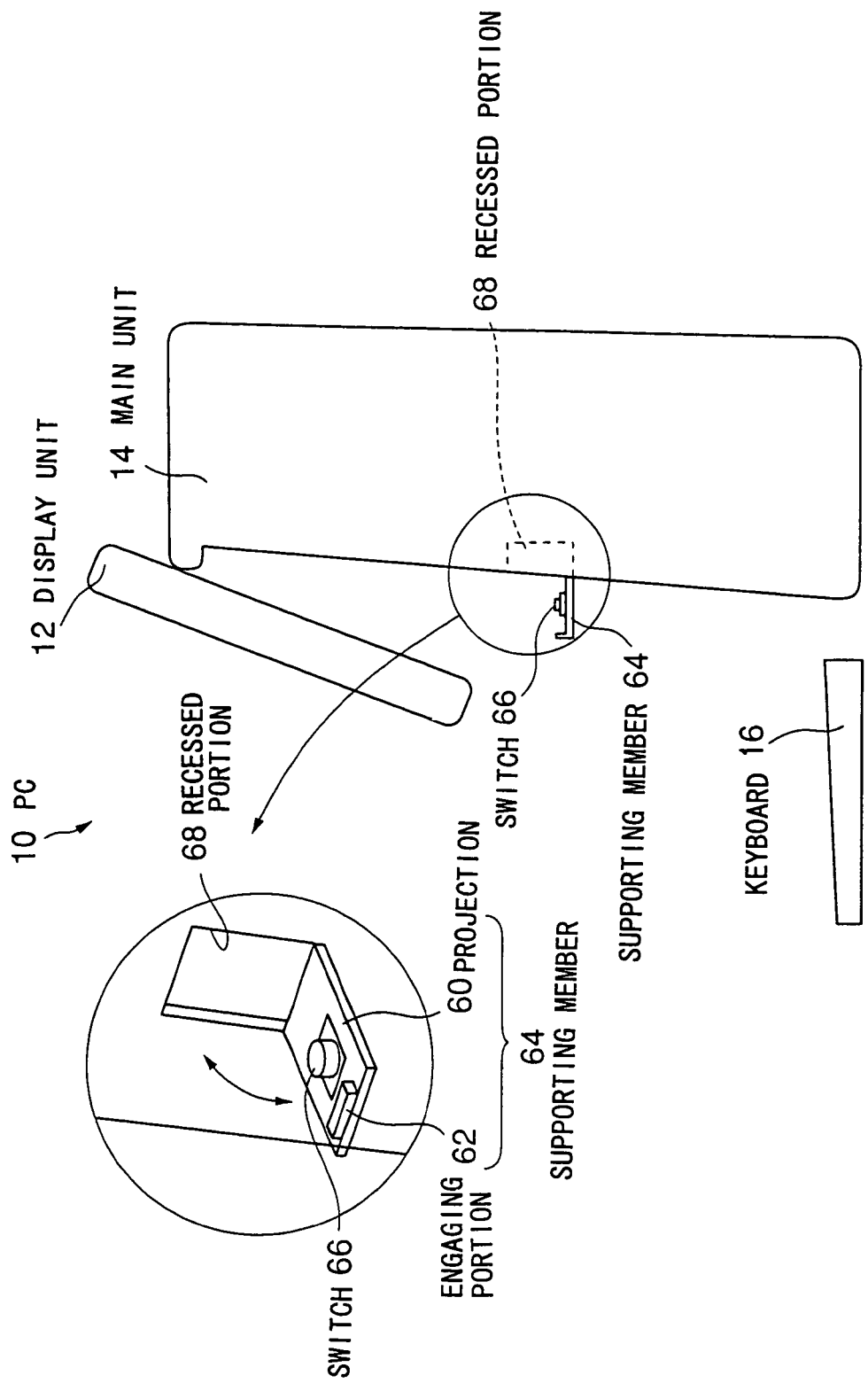
FIG. 20 is a side view of a personal computer according to a seventh embodiment of the present invention, for the purpose of explaining a storage state of a keyboard.
Figure 21:
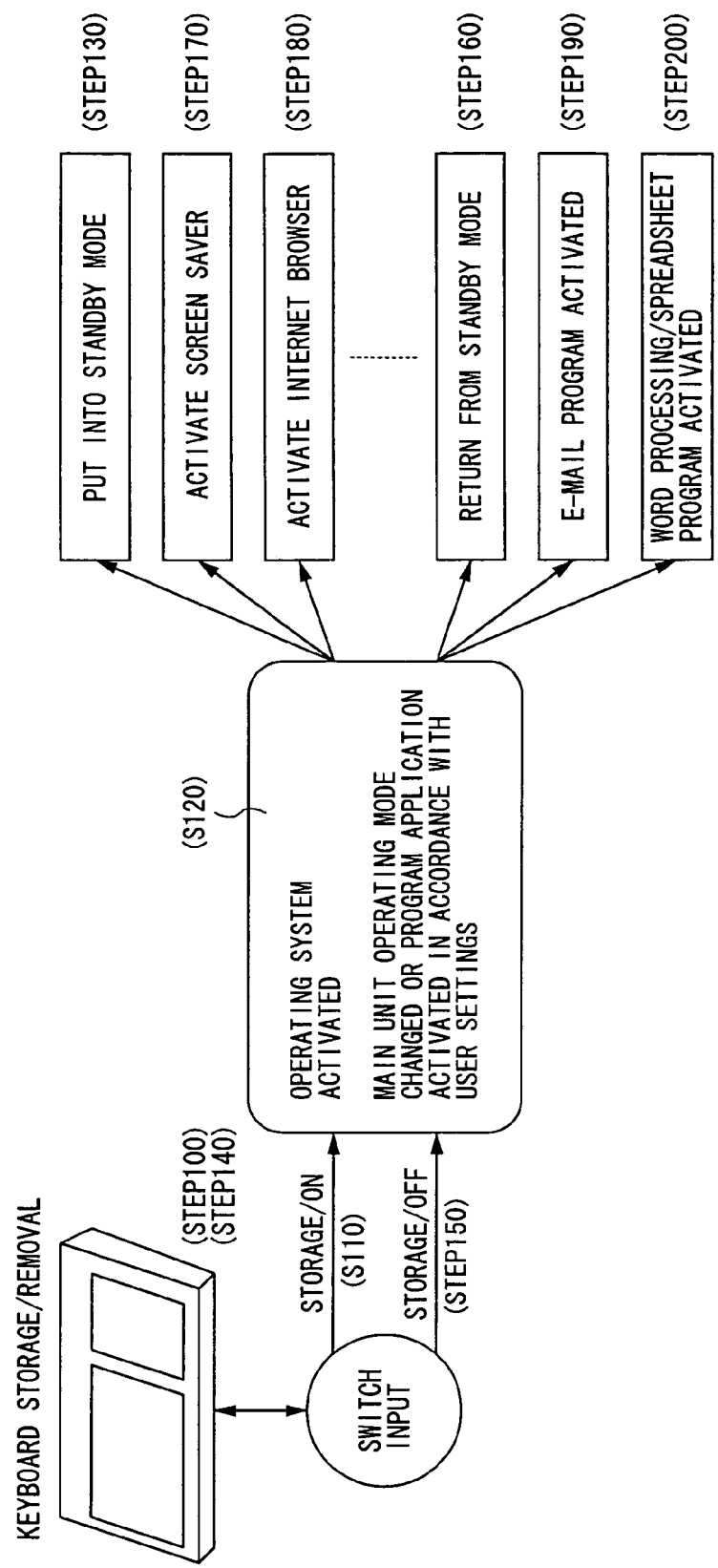
FIG. 21 is a schematic diagram illustrating the personal computer operation control mechanism triggered by the storage and removal of the keyboard.

Next, a description will be given of a personal computer according to a seventh embodiment of the present invention, with reference to FIGS. 19, 20 and 21. FIG. 19 is a side view of a personal computer according to a seventh embodiment of the present invention, for the purpose of explaining a storage state of a keyboard. FIG. 20 is a side view of a personal computer according to a seventh embodiment of the present invention, for the purpose of explaining a storage state of a keyboard. FIG. 21 is a schematic diagram illustrating the personal computer operation control mechanism triggered by the storage and removal of the keyboard.

The basic structure of the apparatus according to the seventh embodiment of the present invention is identical to that of the first embodiment of the present invention as described above. However, in the seventh embodiment of the present invention at least one detector is provided on the main unit for detecting both storage and removal of the keyboard, together with a control means for the operating system to control a desired operation of the personal computer according to signals from the detector.

In other words, at least one supporting member 64 comprising a storable projection 60 and a hook-shaped engaging portion 62 extends from the front surface 14a of the main unit 14, with a switch 66 provided on the projection 60.

A description will now be given of a sequence for storing the keyboard 16, with reference to FIG. 19 which shows a storage state of the keyboard 16. First, the display unit is rotated upward and outward to form a space between the back surface 12b of the display unit 12 and the front surface 14a of the main unit 14. The keyboard 16 is then positioned within the space so formed, and the bottom of the keyboard 16 contacts the supporting member 64 extending from the front surface 14a of the main unit 14 and is supported thereby, comprising a STEP 100 as shown in FIG. 21. At this time the switch 66 is depressed and turns ON, comprising a STEP 110, the operating system is activated in a STEP 120, an operation selected at random by the user such as, for example, an energy-saving standby mode, is enabled in a STEP 130, thereby permitting energy savings without shutting off the power to the personal computer. The display unit 12 is then rotated so as to press slightly against the keyboard 16, thereby sandwiching and storing the keyboard 16 between the display unit 12 and the main unit 14. In such a state, a mouse or other auxiliary input device, for example, is directly enabled, permitting input operation in a state in which additional desktop space that would otherwise have been occupied by the keyboard 16 is freed for other use.

When the keyboard 16 is to be used, the removal of the keyboard 16 from the supporting member 64 in a STEP 140 as shown in FIG. 21 turns the switch 66 OFF in a STEP 150 so that a standby mode, for example, is released in a STEP 160 and input from the keyboard 16 is directly enabled. In a usage state of the keyboard 16 the supporting member 64 is stored in the recessed portion 68 formed in the front surface 14a of the main unit 14.

It should be noted that the user can specify a variety of operations other than the standby mode described above as the desired operation of the personal computer 10 triggered by the actions of storing and removing the input device. The operation of storing the keyboard 16 shown in FIG. 21 as STEP 100 can, for example, activate a screen saver in a STEP 170, for example, or activate an internet browser in a STEP 180, as desired. Additionally, the action of removing the keyboard 16 shown as STEP 140 in FIG. 21 can activate a e-mail program in a STEP 190, for example, or a word processing or spreadsheet program in a STEP 200, as desired.

Accordingly, the same effects and advantages as those obtained with the personal computer according to the first embodiment of the present invention can be obtained with the personal computer according to the above-described seventh embodiment of the present invention, and more particularly, a desired operation of the personal computer can be controlled by the actions of storing and removing the input device.

The above description is provided in order to enable any person skilled in the art to make and use the invention and sets forth the best mode contemplated by the inventors of carrying out their invention.

The present invention is not limited to the specifically disclosed embodiments, and variations and modifications may be made without departing from the scope of the present invention.

The present application is based on Japanese Priority Application No. 11-191023, filed on Jul. 5, 1999, the entire contents of which are hereby incorporated by reference.

What is claimed is:

1. An electronic apparatus to which an input device is connected, comprising:
    a main unit;
    a display unit rotatably attached to the main unit; and
    a retaining mechanism retaining at least one portion of the input device into a space which is formed between the display unit and the main unit when the input device is not used,
    wherein the input device is completely non-destructibly detachable from the space.

2. The electronic apparatus as claimed in claim 1, wherein the retaining mechanism comprises at least one supporting member.

3. The electronic apparatus as claimed in claim 1, wherein the retaining mechanism further comprises a supporting member is mounted so as to be storable in the main unit when the input device is not being stored.

4. The electronic apparatus as claimed in claim 1, wherein the retaining mechanism comprises an engaging member engaging the main unit and the input device.

5. The electronic apparatus as claimed in claim 1, wherein the retaining mechanism further comprises an engaging member is mounted so as to be storable in the main unit when the input device is not being stored.

6. The electronic apparatus as claimed in claim 1, further comprising:
    at least one detector detecting each of a storage and a removal operation of the input device; and
    control means controlling a predetermined operation of the electronic apparatus according to a signal of the detector.

7. An input device detachably connected to an electronic apparatus having a display unit rotatably attached to a main unit, the input device comprising: at least one engaging member engaging the main unit so that at lest one portion of the input device is retained into a space which formed between the display unit and the main unit, wherein the input device is completely non-destructibly detachable from the space.

8. An electronic apparatus, comprising:
    a main unit;
    a keyboard detachable from the main unit;
    a display unit rotatably attached to the main unit, and
    a supporting member rotably mounted to the main unit to hold the keyboard against the main unit when the supporting member is lowered from the main unit the keyboard is mounted on the supporting member, wherein when the keyboard is mounted on the supporting member and the display unit is rotated down, the keyboard is disposed in a space between the display unit and the main unit, wherein the input device is completely non-destructibly detachable from the space.

9. A main unit used for an electronic apparatus to which an input device is connected, the electronic apparatus having a display unit rotatably attached to the main unit,
    the main unit comprising a support member,
    wherein the support member projects from a front surface of the main unit into a space formed between the display unit and the main unit, so that at least one portion of the input device is retained into the space when the input device is not used, and
    wherein the input device is completely non-destructibly detachable from the space.

* * * * *